United States Patent
Westrick, Jr. et al.

(10) Patent No.: US 11,272,424 B2
(45) Date of Patent: Mar. 8, 2022

(54) MESH NETWORK BASED ON A PREDICTIVE PATH MODEL

(71) Applicant: ABL IP HOLDING LLC, Conyers, GA (US)

(72) Inventors: Richard L. Westrick, Jr., Social Circle, GA (US); Alan David Sanders, Atlanta, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 44 days.

(21) Appl. No.: 16/825,264

(22) Filed: Mar. 20, 2020

(65) Prior Publication Data
US 2021/0297927 A1  Sep. 23, 2021

(51) Int. Cl.
| | |
|---|---|
| *H04W 40/30* | (2009.01) |
| *H04B 17/391* | (2015.01) |
| *H04W 4/33* | (2018.01) |
| *H05B 47/19* | (2020.01) |
| *H04W 40/24* | (2009.01) |
| *H04W 88/04* | (2009.01) |
| *H04W 84/18* | (2009.01) |

(52) U.S. Cl.
CPC .......... *H04W 40/30* (2013.01); *H04B 17/391* (2015.01); *H04W 4/33* (2018.02); *H04W 40/246* (2013.01); *H05B 47/19* (2020.01); *H04W 84/18* (2013.01); *H04W 88/04* (2013.01)

(58) Field of Classification Search
CPC ..... H04W 40/30; H04W 40/246; H05B 47/19
See application file for complete search history.

(56) References Cited

U.S. PATENT DOCUMENTS

| | | | | |
|---|---|---|---|---|
| 5,343,466 | A | * | 8/1994 | Kawamura ............. H04L 45/00 370/238 |
| 5,974,236 | A | | 10/1999 | Sherman |
| 9,531,632 | B2 | | 12/2016 | Hellhake et al. |
| 9,820,361 | B1 | | 11/2017 | Turvy, Jr. et al. |
| 9,883,570 | B1 | | 1/2018 | Turvy, Jr. et al. |
| 2002/0042274 | A1 | * | 4/2002 | Ades ................... H04L 41/0863 455/445 |
| 2003/0109270 | A1 | * | 6/2003 | Shorty ................ H04L 12/2803 455/517 |

(Continued)

OTHER PUBLICATIONS

Amir Qayyum et al., "Multipoint relaying for flooding broadcast messages in mobile wireless networks," 35th Annual Hawaii International Conference on System Sciences (HICSS 2002), Jan. 2002, Maui, Hawaii, United States, pp. 3386-3875.

(Continued)

*Primary Examiner* — Jeffrey M Rutkowski
*Assistant Examiner* — Chae S Lee
(74) *Attorney, Agent, or Firm* — RatnerPrestia

(57) ABSTRACT

A radio frequency (RF) communication system comprising a plurality of RF nodes connected via a mesh wireless network. Each of the RF nodes comprises an RF node processor, an RF node wireless transceiver configured for data communication over the mesh wireless network that is coupled to the RF node processor, an RF node memory that is coupled to the RF node processor of the RF node, and a preloaded routing table in the RF node memory including all or a subset of routes in the mesh wireless network.

19 Claims, 22 Drawing Sheets

(56) References Cited

U.S. PATENT DOCUMENTS

| | | | | |
|---|---|---|---|---|
| 2004/0218548 | A1* | 11/2004 | Kennedy | H04W 40/02 370/254 |
| 2012/0076007 | A1* | 3/2012 | Nelson | H04W 52/24 370/252 |
| 2014/0040483 | A1* | 2/2014 | Van Dussen | G06F 15/16 709/227 |
| 2018/0026839 | A1* | 1/2018 | Hollinger | H04L 61/2007 709/222 |

OTHER PUBLICATIONS

Non Final Office Action for U.S. Appl. No. 16/662,691, dated Mar. 8, 2021, 11 pages.
Notice of Allowance for U.S. Appl. No. 16/662,691, dated Mar. 29, 2021, 5 pages.
Notice of Allowance for U.S. Appl. No. 16/811,072, dated May 12, 2021, 10 pages.
Canadian Examination Report for Application No. 3,094,674, dated Nov. 5, 2021, 5 pages.

* cited by examiner

General Repeater Designation Protocol 300

*FIG. 3*

Based on projected or actual neighbor relationships among radio frequency (RF) nodes of a mesh wireless network, designating some but not all of the RF nodes as repeaters, wherein the designating selects (RF) nodes as repeaters such that each RF node of the mesh wireless network has at least two neighboring RF nodes designated as repeaters 305

Configuring designated RF nodes to act as repeaters to receive and resend packet transmissions from other RF nodes through the mesh wireless network 310

Configuring all RF nodes not designated as repeaters not to receive and resend packet transmissions from other RF nodes through the mesh wireless network 320

Matrix of a twenty-four RF node network, depicting path loss between two RF nodes in dB 500

*FIG. 5A*

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | |
|---|---|---|---|---|---|---|---|---|---|---|---|---|---|---|---|---|---|---|---|---|---|---|---|---|---|
| 1 | 0 | 70 | 67 | 73 | 59 | 63 | 72 | 72 | 68 | 66 | 73 | 70 | 70 | 67 | 52 | 65 | 68 | 58 | 65 | 68 | 75 | 52 | 75 | 66 | }501A-X |
| 2 | 70 | 0 | 52 | 73 | 71 | 72 | 71 | 67 | 74 | 72 | 76 | 65 | 74 | 57 | 67 | 64 | 76 | 71 | 74 | 73 | 79 | 68 | 79 | 72 | }502A-X |
| 3 | 67 | 52 | 0 | 71 | 68 | 71 | 71 | 80 | 66 | 73 | 71 | 75 | 63 | 73 | 46 | 65 | 63 | 74 | 70 | 72 | 72 | 78 | 78 | 71 | }503A-X |
| 4 | 73 | 73 | 71 | 0 | 70 | 76 | 80 | 62 | 77 | 78 | 67 | 64 | 79 | 71 | 73 | 75 | 77 | 76 | 74 | 79 | 82 | 72 | 81 | 77 | }504A-X |
| 5 | 59 | 71 | 68 | 70 | 0 | 68 | 75 | 70 | 71 | 71 | 70 | 68 | 73 | 68 | 63 | 69 | 60 | 57 | 66 | 72 | 77 | 58 | 76 | 71 | }505A-X |
| 6 | 63 | 72 | 71 | 76 | 68 | 0 | 70 | 74 | 54 | 59 | 75 | 73 | 62 | 71 | 69 | 67 | 75 | 70 | 61 | 59 | 68 | 66 | 68 | 56 | }506A-X |
| 7 | 72 | 71 | 71 | 80 | 75 | 70 | 0 | 77 | 71 | 65 | 81 | 76 | 66 | 73 | 71 | 64 | 76 | 74 | 75 | 67 | 76 | 72 | 78 | 66 | }507A-X |
| 8 | 72 | 67 | 80 | 62 | 70 | 74 | 77 | 0 | 76 | 76 | 72 | 52 | 78 | 65 | 67 | 72 | 60 | 70 | 74 | 77 | 81 | 70 | 80 | 76 | }508A-X |
| 9 | 68 | 74 | 66 | 77 | 71 | 54 | 71 | 76 | 0 | 63 | 76 | 75 | 74 | 62 | 64 | 70 | 75 | 66 | 63 | 62 | 64 | 72 | 64 | 59 | }509A-X |
| 10 | 66 | 72 | 73 | 78 | 71 | 59 | 65 | 76 | 63 | 0 | 78 | 75 | 56 | 72 | 64 | 64 | 69 | 61 | 69 | 42 | 71 | 68 | 73 | 47 | }510A-X |
| 11 | 73 | 76 | 71 | 67 | 70 | 75 | 81 | 72 | 76 | 78 | 0 | 72 | 79 | 75 | 74 | 77 | 74 | 75 | 72 | 78 | 80 | 73 | 79 | 77 | }511A-X |
| 12 | 70 | 65 | 75 | 64 | 68 | 73 | 76 | 52 | 75 | 75 | 72 | 0 | 77 | 62 | 69 | 70 | 75 | 73 | 73 | 76 | 80 | 67 | 80 | 74 | }512A-X |
| 13 | 70 | 74 | 63 | 79 | 73 | 62 | 66 | 78 | 74 | 56 | 79 | 77 | 0 | 74 | 68 | 68 | 70 | 66 | 70 | 55 | 68 | 71 | 72 | 53 | }513A-X |
| 14 | 67 | 57 | 73 | 71 | 68 | 71 | 73 | 65 | 62 | 72 | 75 | 62 | 74 | 0 | 65 | 64 | 75 | 70 | 73 | 73 | 79 | 64 | 79 | 72 | }514A-X |
| 15 | 52 | 67 | 46 | 73 | 63 | 69 | 71 | 67 | 64 | 64 | 74 | 69 | 68 | 65 | 0 | 59 | 69 | 56 | 66 | 65 | 75 | 53 | 75 | 64 | }515A-X |
| 16 | 65 | 64 | 65 | 75 | 69 | 67 | 64 | 72 | 70 | 64 | 77 | 70 | 68 | 64 | 59 | 0 | 72 | 65 | 71 | 66 | 76 | 64 | 76 | 65 | }516A-X |
| 17 | 68 | 76 | 63 | 77 | 60 | 75 | 76 | 60 | 75 | 69 | 74 | 75 | 70 | 75 | 69 | 72 | 0 | 66 | 52 | 69 | 71 | 70 | 66 | 67 | }517A-X |
| 18 | 58 | 71 | 74 | 76 | 57 | 70 | 74 | 70 | 66 | 61 | 75 | 73 | 66 | 70 | 56 | 65 | 66 | 0 | 64 | 62 | 73 | 60 | 73 | 60 | }518A-X |
| 19 | 65 | 74 | 70 | 74 | 66 | 61 | 75 | 74 | 63 | 69 | 72 | 73 | 70 | 73 | 66 | 71 | 52 | 64 | 0 | 69 | 72 | 67 | 68 | 67 | }519A-X |
| 20 | 68 | 73 | 72 | 79 | 72 | 59 | 67 | 77 | 62 | 42 | 78 | 76 | 55 | 73 | 65 | 66 | 69 | 62 | 69 | 0 | 71 | 69 | 73 | 38 | }520A-X |
| 21 | 75 | 79 | 78 | 82 | 77 | 68 | 76 | 81 | 64 | 71 | 80 | 80 | 68 | 79 | 75 | 76 | 71 | 73 | 72 | 71 | 0 | 76 | 65 | 69 | }521A-X |
| 22 | 52 | 68 | 64 | 72 | 58 | 66 | 72 | 70 | 72 | 68 | 73 | 67 | 71 | 64 | 53 | 64 | 70 | 60 | 67 | 69 | 76 | 0 | 76 | 68 | }522A-X |
| 23 | 75 | 79 | 78 | 81 | 76 | 68 | 78 | 80 | 64 | 73 | 79 | 80 | 72 | 79 | 75 | 76 | 66 | 73 | 68 | 73 | 65 | 76 | 0 | 71 | }523A-X |
| 24 | 66 | 72 | 71 | 77 | 71 | 56 | 66 | 76 | 59 | 47 | 77 | 74 | 53 | 72 | 64 | 65 | 67 | 60 | 67 | 38 | 69 | 68 | 71 | 0 | }524A-X |

*FIG. 5B*

Matrix of a twenty-four RF node network, depicting neighbor connections based on path loss 550

Matrix of a twenty-four RF node network, depicting connections based on single-connection, minimal repeater algorithm 575

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | |
|---|---|---|---|---|---|---|---|---|---|---|---|---|---|---|---|---|---|---|---|---|---|---|---|---|---|
| 4 | | | | | 1 | | | | | | | | | | | | | | | | | 1 | | | }576A-X |
| 5 | | | | 1 | | | | | | | | | | | | | | | | | | 1 | | | }577A-X |
| 6 | | | | | | 1 | 1 | | | | | | | | | | | | | | | 1 | | | }578A-X |
|   | | | | | | | | | | | | | | | | | | | | | | 1 | | | }579A-X |
|   | | | | | | | | | | | 1 | | | | | | | | | | | 1 | | | }580A-X |
|   | | | | | | | 1 | | | | | | | | | | | | | | | 1 | 1 | | }581A-X |
|   | | | | | | 1 | | | | | | | 1 | | | | | | | | 1 | | | | }582A-X |
|   | | | | | | | | | | | | | | | | | | | | | | 1 | | | }583A-X |
|   | | | | | | | | | | | | | | | | | | | | | | 1 | | | }584A-X |
|   | | | | | | | | | | | | | | | | | | | | | | 1 | | | }585A-X |
|   | | | | | | | | | | | | | | | | | | | | | | | 1 | | }586A-X |
|   | | | | | | | | | | | | | | | | | | | | | | 1 | | | }587A-X |
|   | | | | | | | | | | | | | | | | | | | | | | 1 | | | }588A-X |
|   | | | | | | | | | | | | | | | | | | | | | | 1 | | | }589A-X |
|   | | | | | | | | | | | | | | | | | | | | | | 1 | | | }590A-X |
|   | | | | | | | | | | | | | | | | | | | | | | 1 | | | }591A-X |
|   | | | | | | | | | | | | | | | | | | | | | | 1 | | | }592A-X |
|   | | | | | | | | | | | | | | | | | | | | | | 1 | | | }593A-X |
|   | | | | | | | | | | | | | | | | | | | | | | 1 | | | }594A-X |
|   | | | | | | | | | | | | | | | | | | | | | | 1 | | | }595A-X |
|   | | | | | | 1 | | 1 | 1 | 1 | 1 | 1 | | 1 | 1 | 1 | 1 | 1 | 1 | 1 | | | | | }596A-X |
| 22 | 1 | 1 | 1 | | | 1 | | | | | | | | | | | | | | | | | | | }597A-X |
|   | | | | | | | | | | | | | | | | | | | | | | | | | }598A-X |
|   | | | | | | | | | | | | | | | | | | | | | | 1 | | 1 | }599A-X |

FIG. 5C

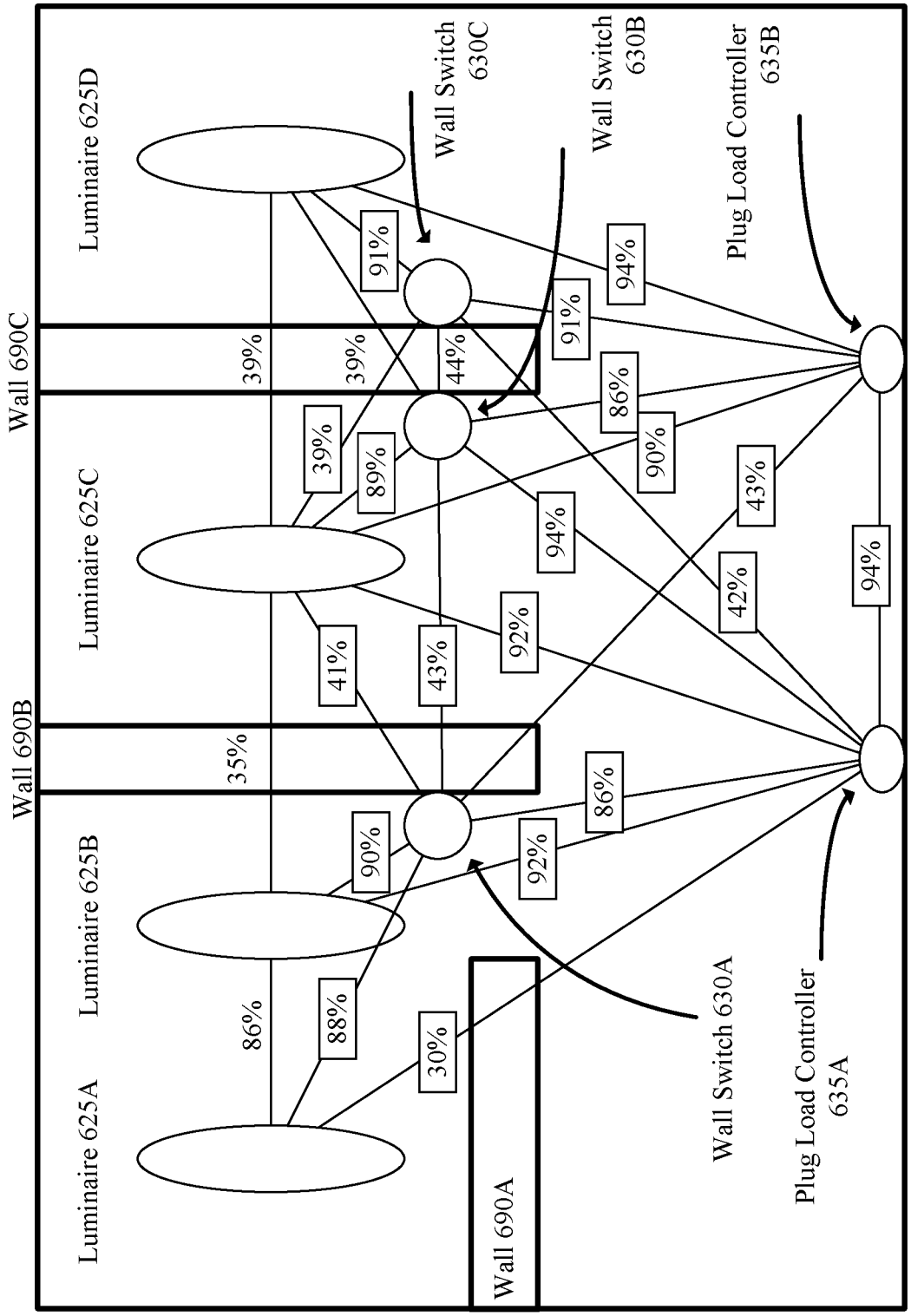

RF map of a room with actual RF nodes installed, and the actual tabled routes between RF nodes 600D

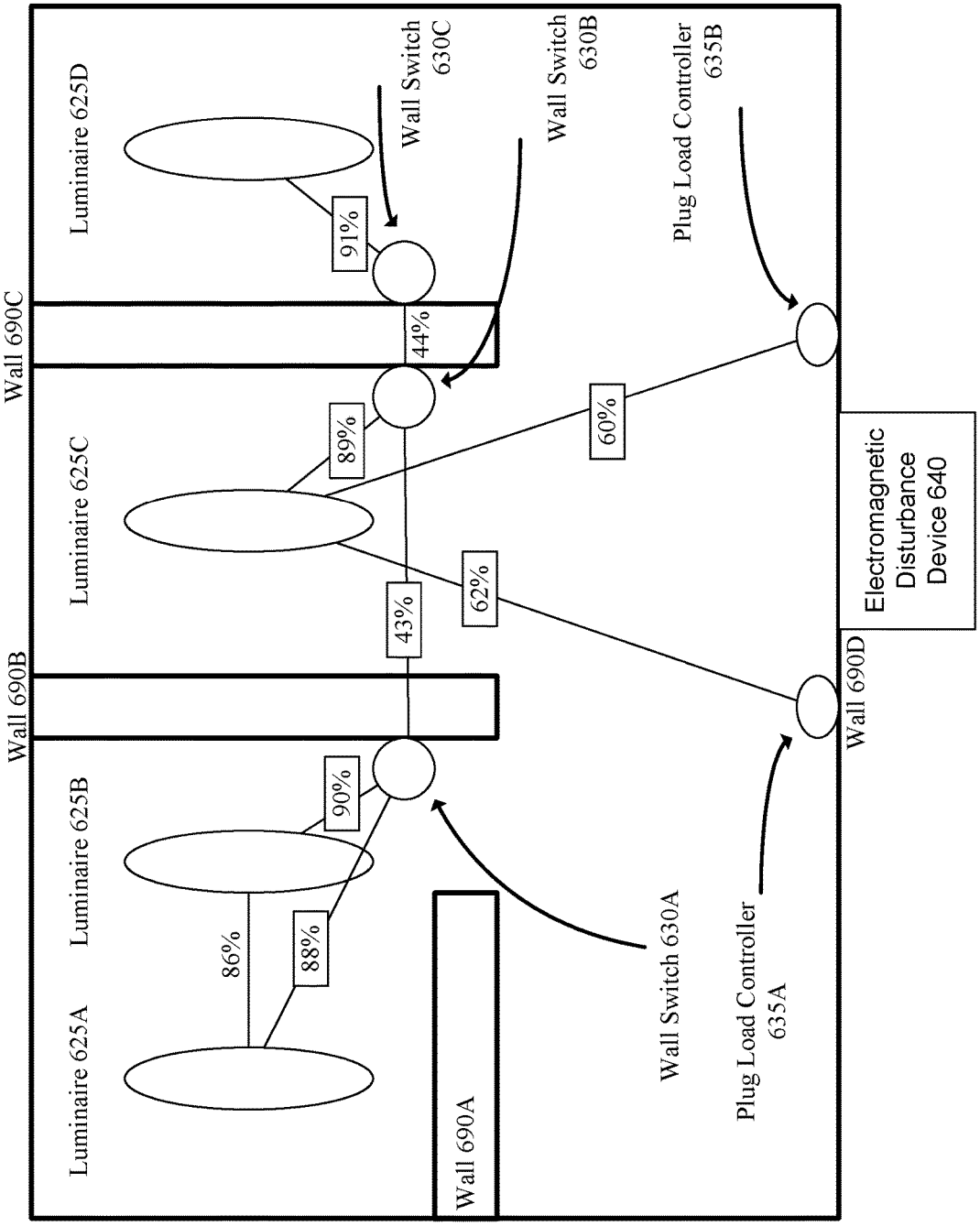

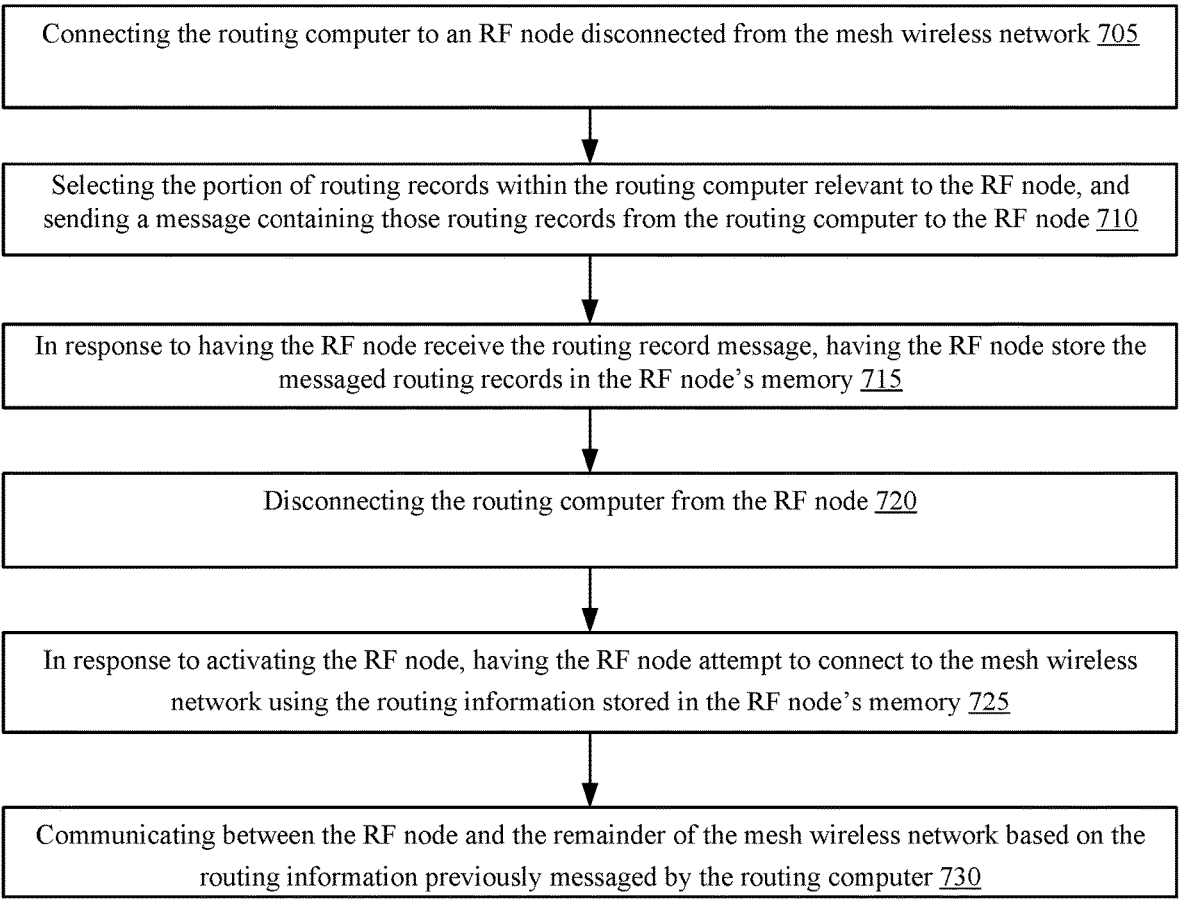

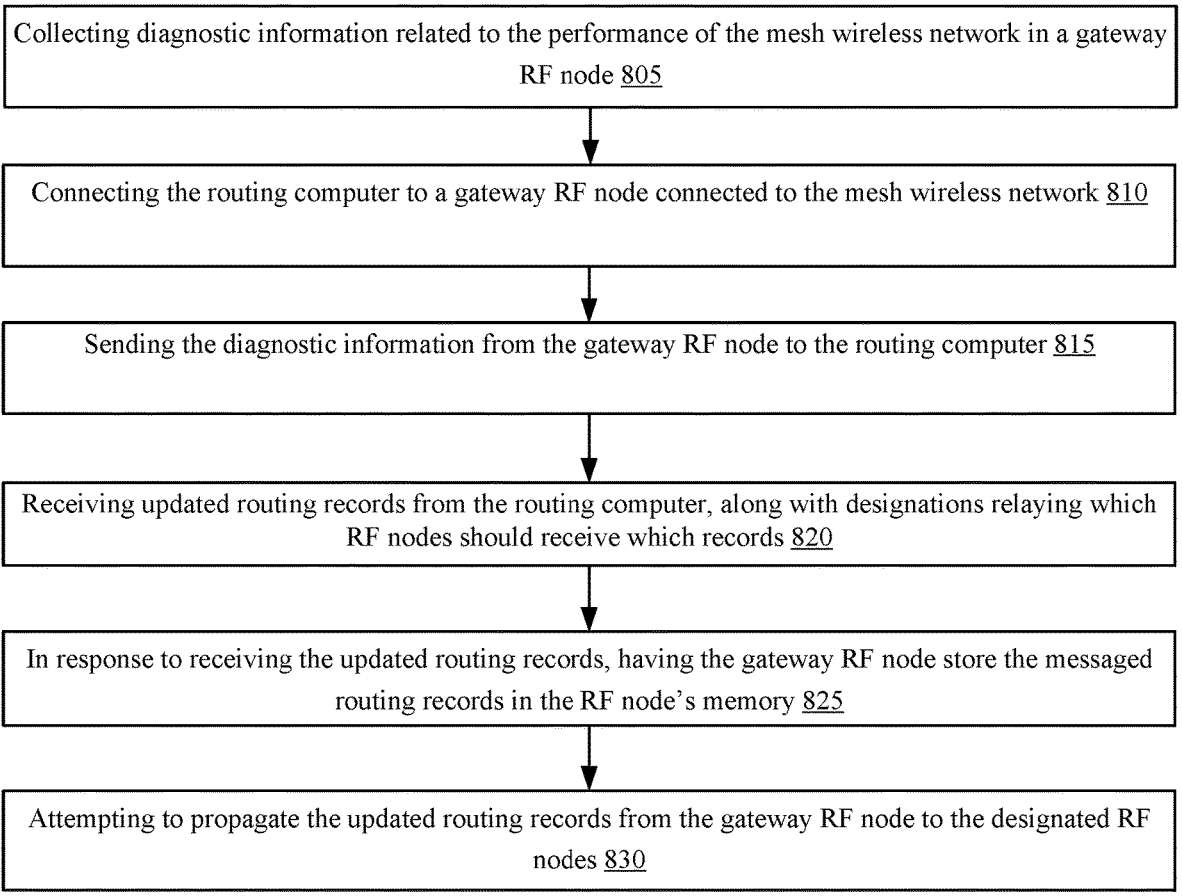

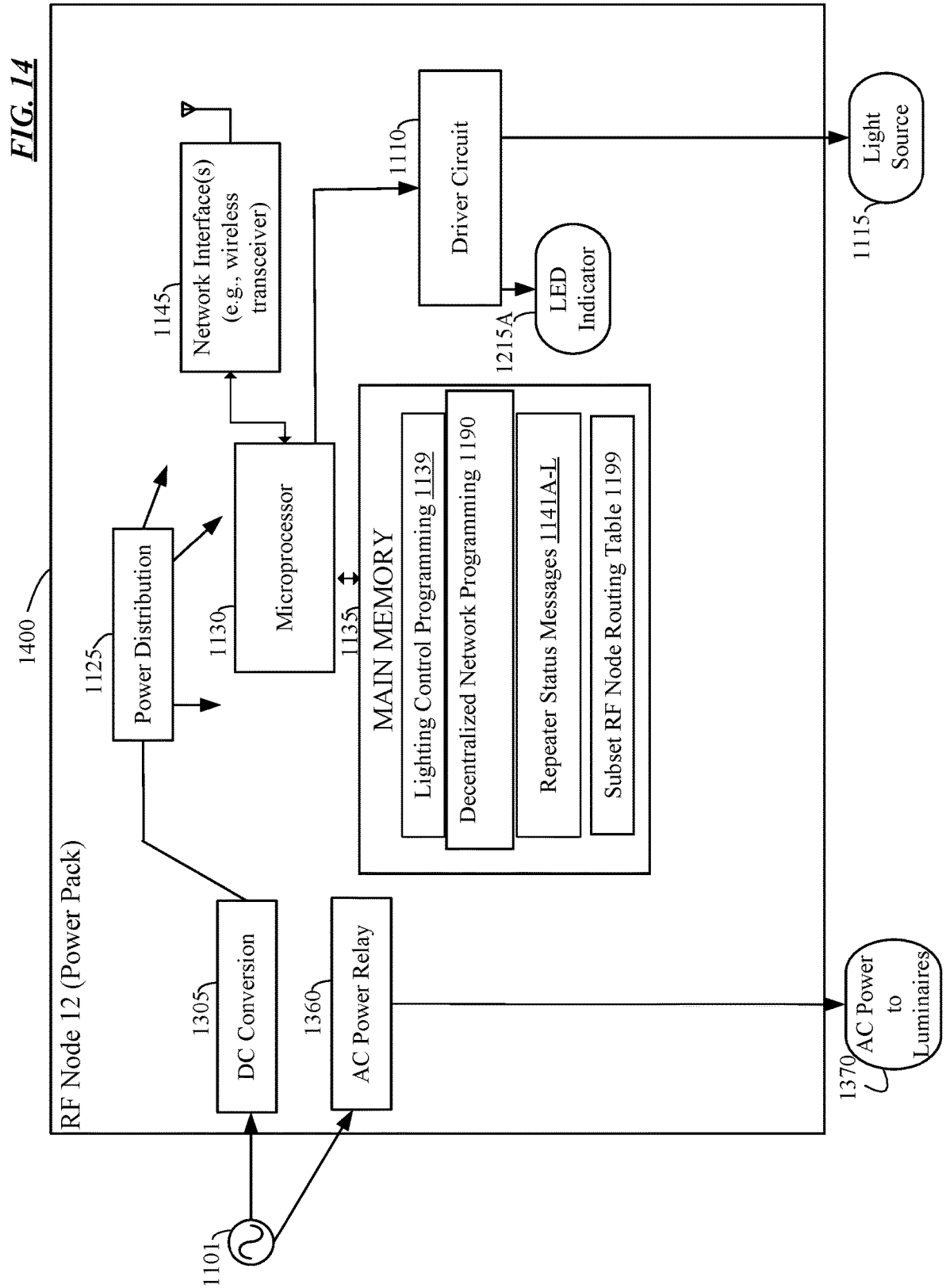

MESH NETWORK BASED ON A PREDICTIVE PATH MODEL

BACKGROUND

Electrically powered artificial lighting for general illumination has become ubiquitous in modern society. Electrical lighting equipment is commonly deployed, for example, in homes, buildings of commercial and other enterprise establishments, as well as in various outdoor settings.

In conventional luminaires, the luminance output can be turned ON/OFF and often can be adjusted up or dimmed down. In some devices, e.g., using multiple colors of light emitting diode (LED) type sources, the user may be able to adjust a combined color output of the resulting illumination. The changes in intensity or color characteristic of the illumination may be responsive to manual user inputs or responsive to various sensed conditions in or about the illuminated space.

Conventional wall switches and light fixtures communicate over wired systems. More recent lighting systems are wireless, which allow communication over a radio frequency (RF) network; however, it is difficult to control these systems as the systems scale in size. Some wireless lighting communication control systems communicate over a routing mesh. In a routing mesh, network packets are addressed through the network one node to the next, as in A(B(D(F (E)))). If the network packet does not get through the network, the dropped network packet can be detected and a new route tried. One goal of a routing algorithm is to minimize hops, while maintaining reliability.

Some routing meshes use a flood network. In an uncontrolled flood network, every incoming network packet sent from a source RF node is sent to all other RF nodes except the source RF node. Unless conditional logic is used, broadcast storms can occur. In a controlled flood network, RF nodes receive every network packet for a group and decide whether to repeat the network packet. In the controlled flood network, algorithms are used to ensure reliable delivery and head off broadcast storms, for example, based on sequence number controlled flooding (SNCF) and reverse path forwarding (RPF).

In SNCF, the RF node attaches its own address and sequence number to the network packet. If the RF node receives a network packet in memory, it drops the network packet immediately while in RPF, the RF node will only send the network packet forward. If the network packet is received from the next RF node, it sends it back to the sender. While SNCF and RPF result in every message eventually being delivered to all reachable parts of the network, algorithms may need to be more complex. In some cases, precautions have to be taken to avoid wasted duplicate deliveries and infinite loops, and to allow network packets to eventually expire from the system.

Users of a lighting system or industrial control systems additionally expect prompt responses: waiting even several second for a light switch to turn on or off a luminaire would result in a consumer experience so poor as to be unacceptable. Therefore, RF nodes in these systems need to have their routes quickly established: messages between RF nodes need to be sent in essentially real-time, and there is not enough time for a lengthy calculation phase within the RF node to determine the most efficient or stable messaging route through the mesh network.

Accordingly, a system is needed to overcome these and other limitations in the art, including pre-loading routing information within the RF nodes, in order to reduce routing calculation time when network messages are sent.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is a flow chart of a general repeater designation protocol to efficiently designate repeaters over the mesh wireless network, specifically designating at least N repeaters.

FIG. 5A is an example of a matrix of repeater relationships, defined by the amount of decibels of path loss between any two RF nodes in the mesh wireless network.

FIG. 5B is an example of a processed matrix of repeater relationships, with potential connections defined by being under a threshold of path loss between any two RF nodes in the mesh wireless network.

FIG. 5C is an example of an RF node repeater matrix, comprising the actual connections to be used in routing the mesh wireless network.

FIG. 6C is a map of actual connections between installed RF nodes in the room depicted in FIG. 6A, and their actual quality percentage ratings.

FIG. 6F is a map of the revised actual routes between installed RF nodes in the room depicted in FIG. 6E, after a gateway device sent updated connection quality percentage ratings to the routing computer, and the routing computer replied with new routes between the installed RF nodes.

FIG. 7 is a flow chart of a method of the decentralized repeater designation protocol for designating some but not all of the RF nodes of the mesh wireless network as repeaters.

FIG. 8 is a flow chart of a method of the routing computer updating the routing records in a particular RF node before that RF node is installed in the physical space the mesh wireless network covers.

FIG. 14 is a block diagram of a power pack that communicates via the mesh wireless network of FIG. 1.

DETAILED DESCRIPTION

Figure 1:
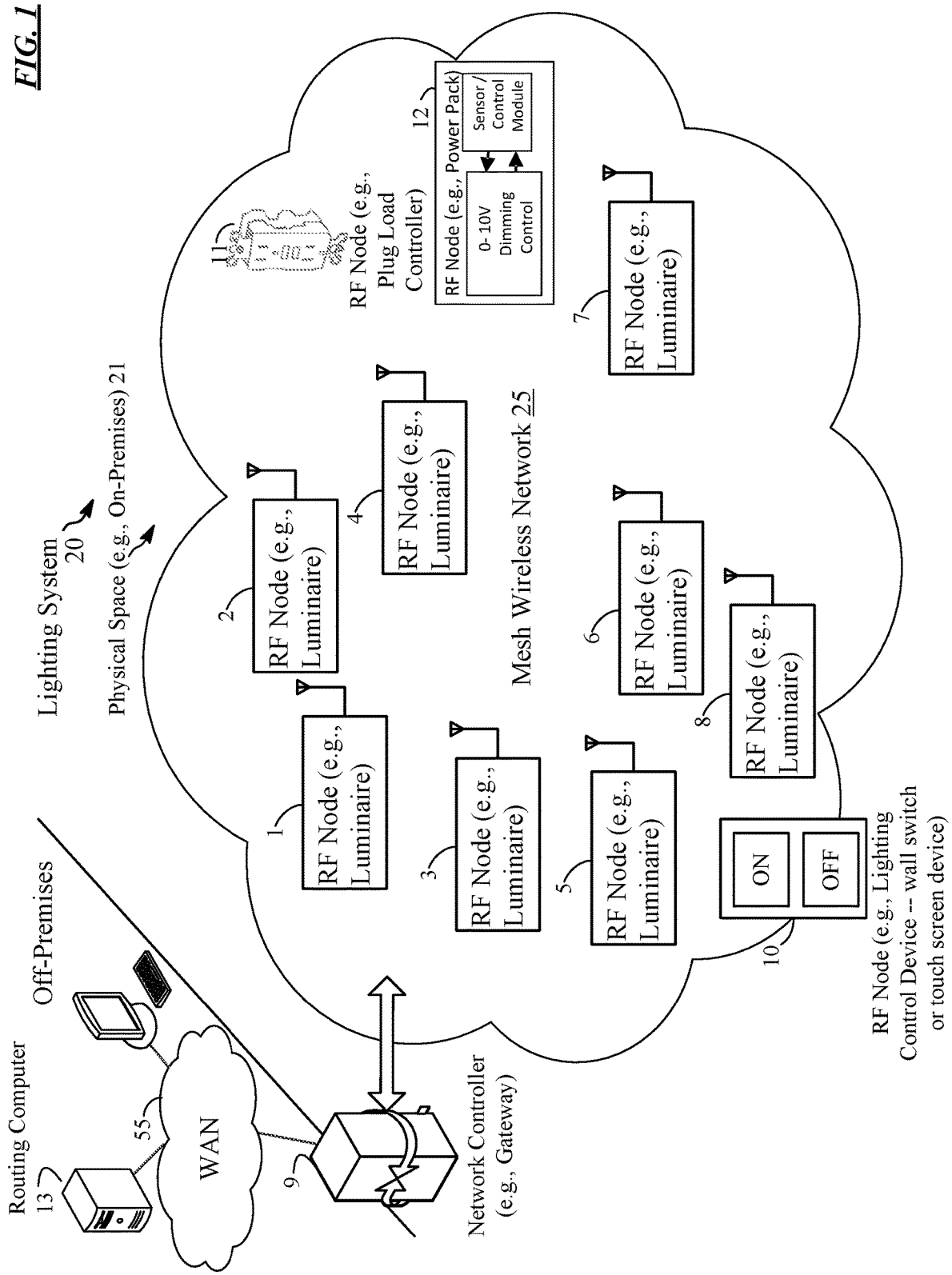
FIG. 1 illustrates a functional block diagram of an example of a wireless lighting system that includes a mesh wireless network of RF nodes and a routing computer.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Although the discussion herein is focused on light fixture type luminaires that have a fixed position in a space, it should be understood that other types of luminaires can be used/sensed in lieu of light fixtures, such as lamps, particularly if the lamps have a fixed position in the space. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The space, where the mesh network is operating, can include a variety of manmade structures or natural spaces modified by direct or indirect human efforts. The space conventionally may be a retail space, but it could also be, for example, an office space, a warehouse, or a hangar. It could also be an outdoor space with node installations, such as a parking lot, or a roadway. The space could also be a mixed use area, such as a transportation hub with both indoor and outdoor mesh network members, or an airport. The space could further be a natural but modified space, such as a cavern, a cliff face, or an underwater grotto. The space could provide economic benefit to the mesh network owner, or could be a frivolous expenditure. A building space is a space that is partially or completely occupied by a structure.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

FIG. 1 illustrates a functional block diagram of an example of a wireless lighting system 20 that includes a mesh wireless network 25 of radio frequency (RF) nodes. The mesh wireless network 25 supports light commissioning/control/maintenance to provide a variety of lighting control, including communications in support of turning lights on/off, dimming, set scene, and sensor trip events. The twelve RF nodes include eight luminaires 1-8, a gateway (e.g., network controller) 9, lighting control device 10 (e.g., wall switch or touch screen device), a plug load controller 11, and a power pack 12. RF nodes 1-8, 10-12 in some embodiments can execute decentralized network assessment programming (elements 1190 of FIGS. 11-14) to assess the strength of routing between RF nodes of the mesh wireless network 25, and a lighting control application (element 1139 of FIGS. 11-14) for communication over the mesh wireless network 25. RF nodes 1-12 are installed in a physical space (e.g., on-premises) 21, which can be in indoor or outdoor installation area.

Each RF node, such as luminaires 1-8, gateway 9, lighting control device 10, plug load controller 11, and power pack 12 can be equipped with a wireless network transceiver. For example, the wireless network transceiver can include a near range Bluetooth Low Energy (BLE) radio that communicates over the mesh wireless network 25 for purposes of commissioning, maintenance, and control operation of the wireless lighting system 20.

Plug load controller 11 plugs into existing AC wall outlets, for example, and allows existing wired lighting devices, such as table lamps or floor lamps that plug into a wall outlet, to operate in the lighting control system 1. Plug load controller 11 instantiates a wired lighting device, such as a table lamp or floor lamp, by allowing for commissioning and maintenance operations and processes wireless lighting controls in order to the allow the wired lighting device to operate in the lighting system 20.

Power pack 12 retrofits with existing wired light fixtures (luminaires). Power pack 12 instantiates the wired light fixture by allowing for commissioning and maintenance operations and processes wireless lighting controls in order to allow a wired lighting device to operate in the lighting system 20.

Not part of the lighting system 20 or the mesh wireless network 25, but still essential to establishing the mesh wireless network 25, is the routing computer 13. This device is not an RF node, though it may have some hardware similarities. This routing computer interacts with the RF nodes 1-12 of the mesh wireless network 25 on an individualized basis, such as through a one-on-one connection utilizing the RF node's 1-12 wireless transceiver 1145. Alternatively, the routing computer 13 can interact with the RF nodes 1-12 via a network controller 9, if the particular lighting system 20 makes use of one.

The specific hardware, software, and firmware of luminaires 1-8, gateway 9, lighting control device 10, plug load controller 11, and power pack 12 are depicted and described in detail in FIGS. 10-14. It should be understood that in the example herein, the luminaires 1-8, gateway 9, lighting control device 10, plug load controller 11, and power pack 12 are just one example of an RF node, which includes additional components. Hence, the decentralized network assessment programming 1190 of FIGS. 11-14 described herein can be applied to various other types of RF nodes.

Figure 10:
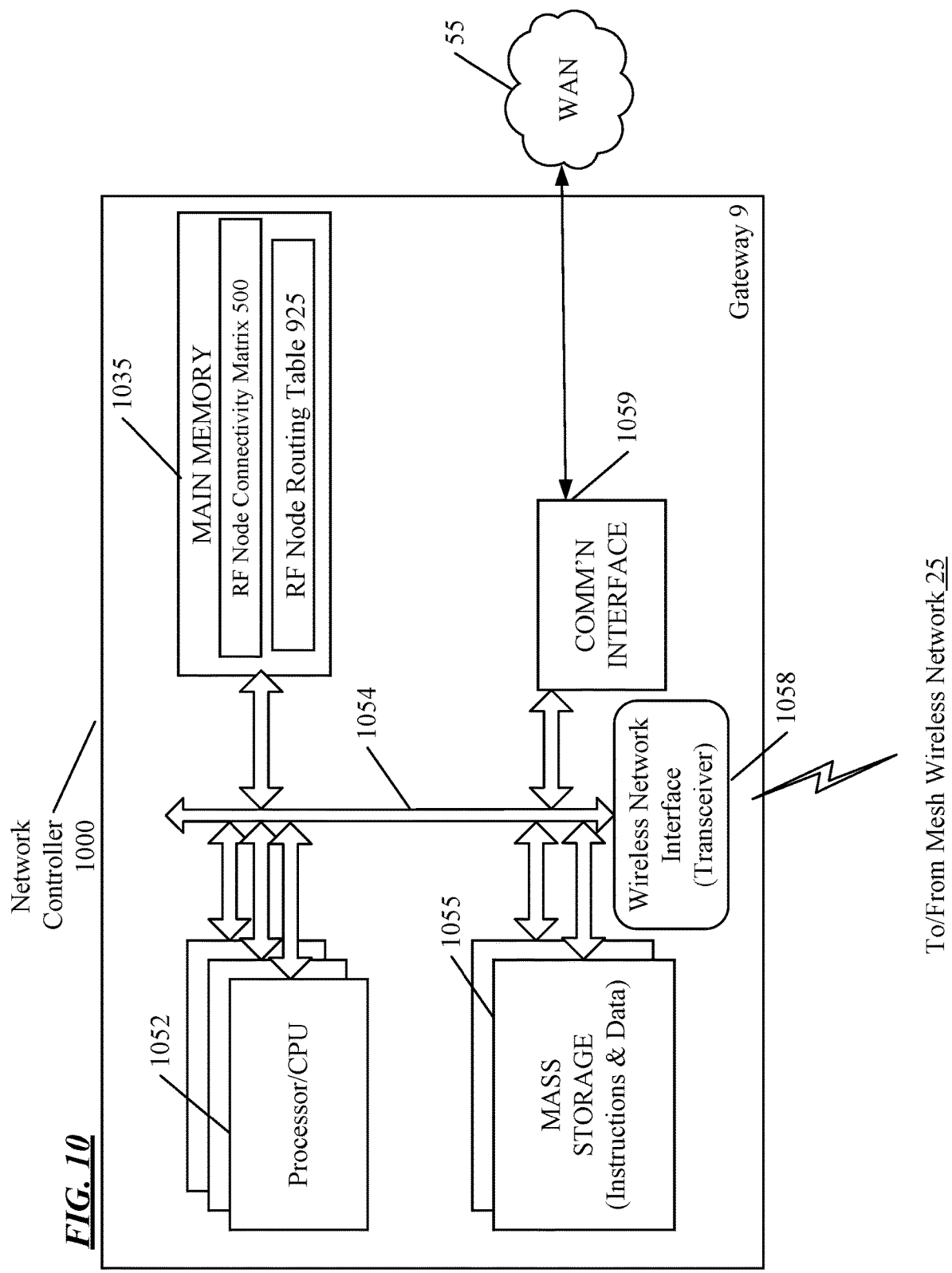
FIG. 10 is a functional block diagram of the gateway RF node used in some embodiments, by way of just one example of a computing device platform that may perform the functions of the network controller.
Figure 11:
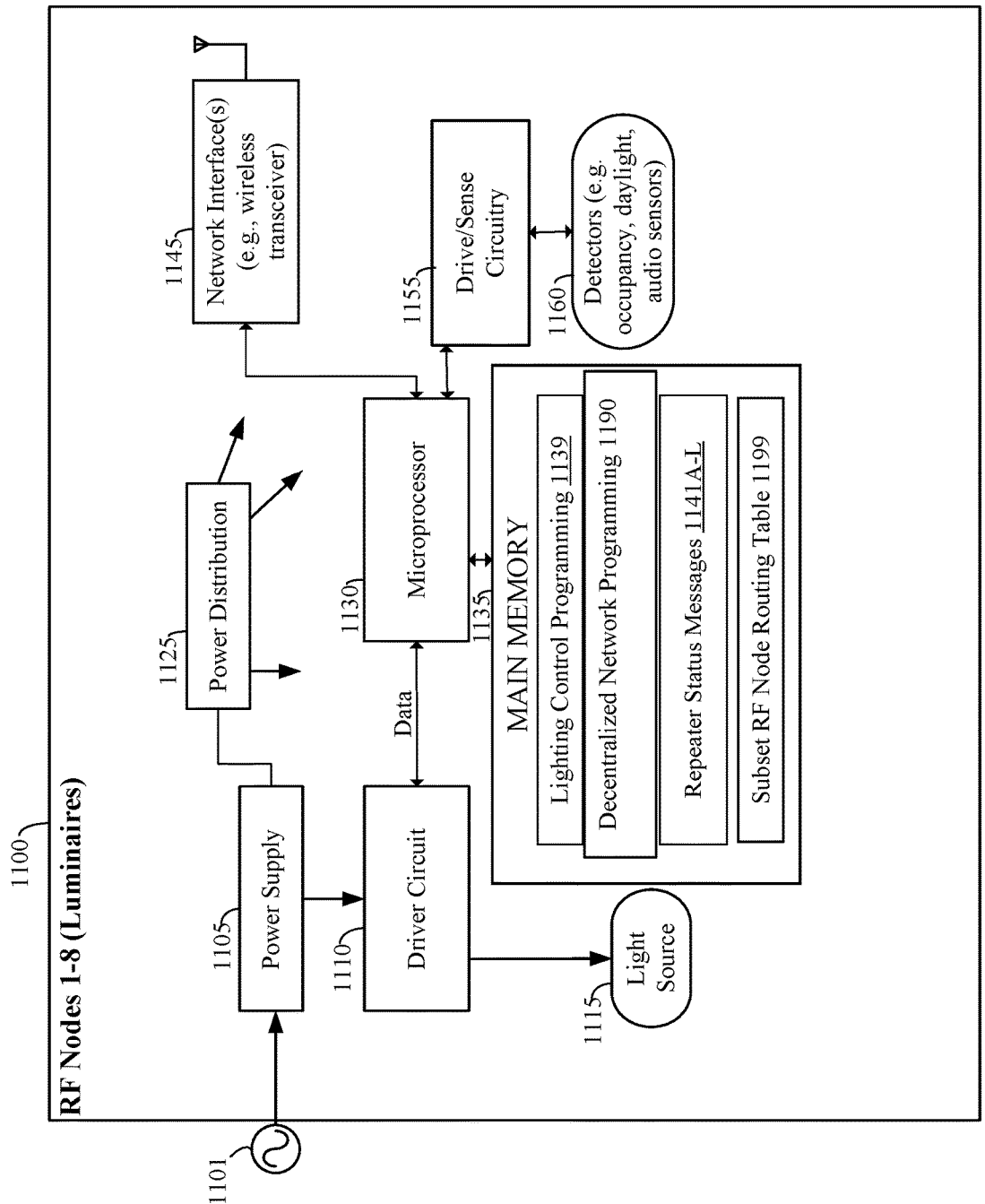
FIG. 11 is a block diagram of a luminaire configured as RF nodes that communicate via the mesh wireless network in the lighting system of FIG. 1.

Generally, an RF node includes a minimum subset of components of the luminaire 1100 shown in FIG. 11, such as the wireless transceiver 1145, memory 1135 (including the decentralized repeater designation programming 1190), microprocessor 1130, and power supply 1105. However, the RF node does not have to include the light source 1115, driver circuit 1110, drive/sense circuitry 1155, and detector(s) 1160 components. An RF node can also implement the network controller 1000 of FIG. 10 and thus may include components like that shown in FIG. 10 for the gateway 9, such as memory 1035 (including matrix repeater designation programming 1090). A wireless beacon is an example of an RF node that is a chip with a radio that emits a signal with a certain signal strength, small packets of information, and has an RF positioning node identifier. RF nodes can be connected together via the mesh wireless network 25.

A routing computer 13 generally includes a wireless transceiver 958, memory 935, and microprocessor 952. The routing computer 13 is configured to not join the lighting system 20 via the wireless mesh network 25 directly, and may possess other components such as a light source 1115, driver circuit 1110, or detector(s) 1160 components. However, any such components are not available to the lighting system 20, and are therefore not relevant. The routing computer 13 can communicate with individual RF nodes 1-12, for example by its wireless network interface 958, or by communicating indirectly with the RF nodes 1-12 over its communication interface 959, with a gateway 9 device communicating to non-gateway RF nodes 1-8, 10-12, in the lighting system 20, on behalf of the routing computer 13.

Figure 2:
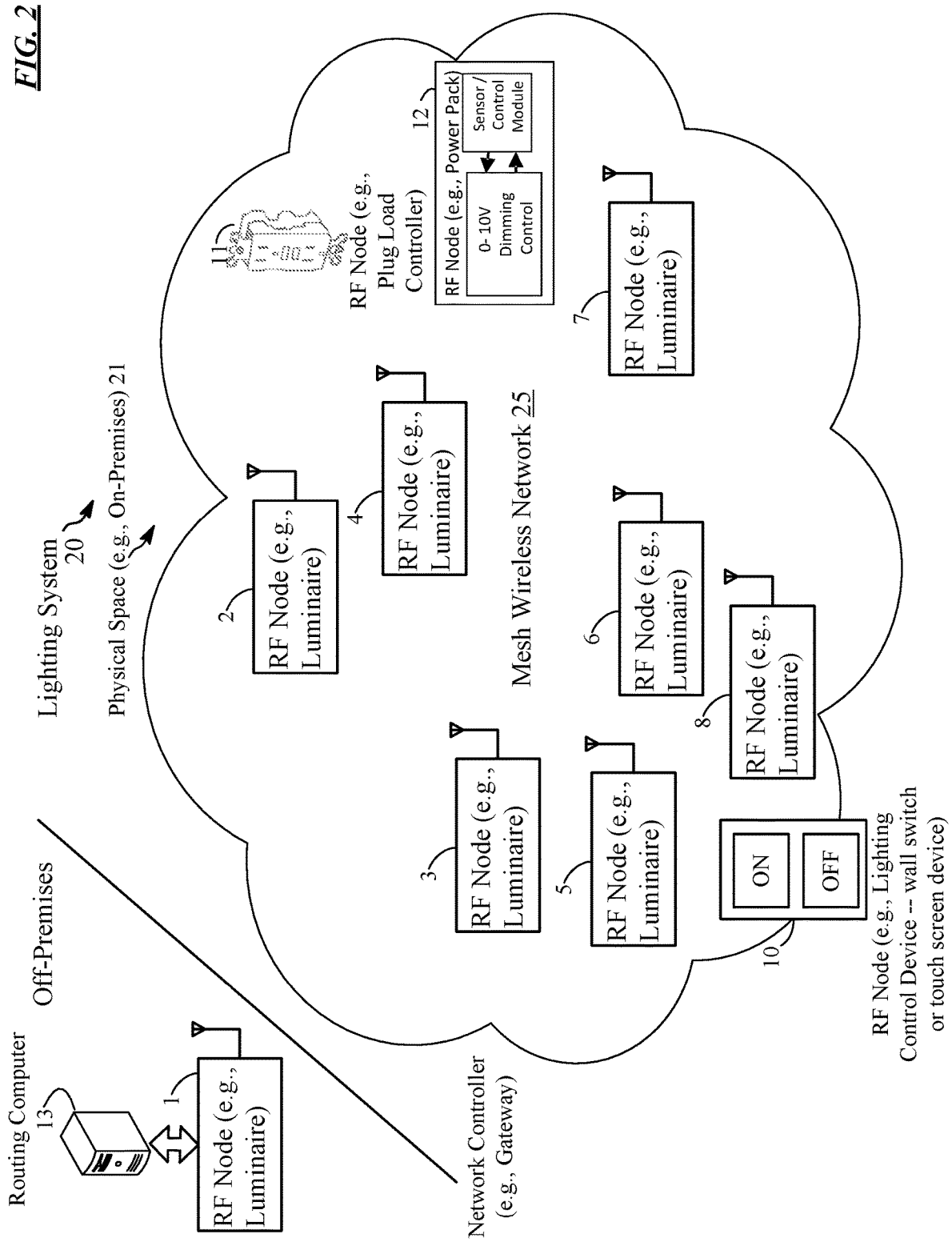
FIG. 2 illustrates a functional block diagram of an example of a wireless lighting system that includes a routing computer configuring an out-of-network RF node to join the mesh wireless network of RF nodes.

FIG. 2 illustrates a substantially similar functional block diagram from FIG. 1 of an example wireless lighting system 20 that includes a mesh wireless network 25 of radio frequency (RF) nodes. The material change is that this lighting system 20 has no gateway 9 device, and so the routing computer 13 is depicted as directly communicating with an RF node 1 while that RF node 1 is not connected to the mesh wireless network 25. This situation might occur when the other RF nodes 2-8, 10-12 have already been configured, installed, and activated, and the routing computer 13 is configuring the final RF node 1 in preparation for installation in the physical space 21 and activation to join the final RF node 1 to the rest of the mesh wireless network 25.

Figure 4:
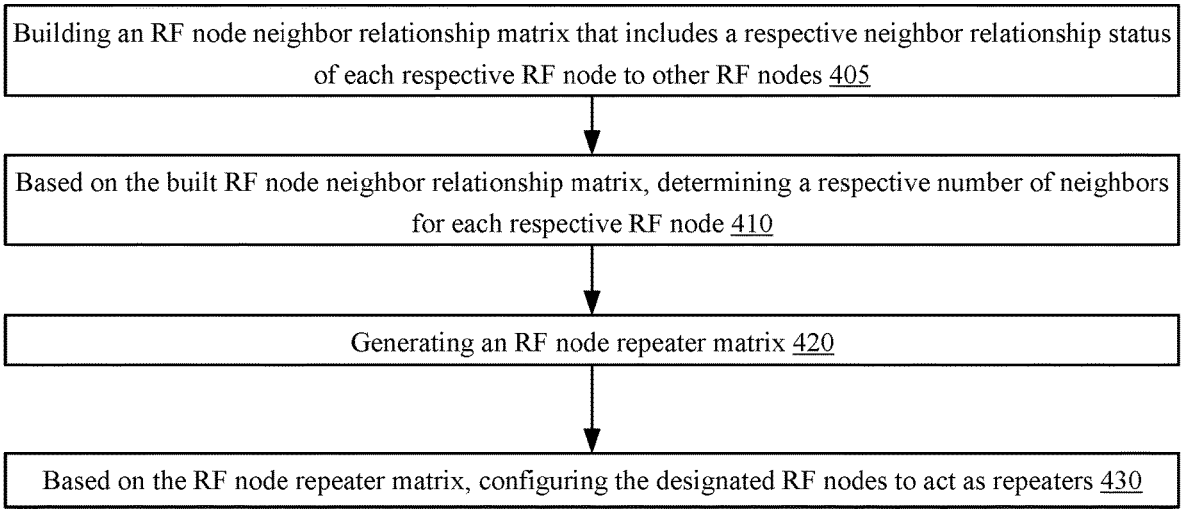
FIG. 4 is a flow chart of an example matrix repeater designation protocol for designating some but not all of the RF nodes of the mesh wireless network as repeaters.

FIG. 3 is a flow chart of a general repeater designation protocol 300 to efficiently designate repeaters over the mesh wireless network 25, specifically designating at least N repeaters. This general repeater designation protocol covers the matrix repeater designation programming 1090 of FIGS. 4 and 10. The matrix repeater designation programming 1090 of FIGS. 4 and 10 is centralized and is implemented only in the routing computer 13.

Beginning in block 305, the general repeater designation protocol 300 includes based on projected or actual neighbor relationships among RF nodes 1-12 of a mesh wireless network 25, designating some but not all of the RF nodes 1-12 as repeaters. The designating includes selecting (RF) nodes as repeaters such that each RF node 1-12 of the mesh wireless network 25 has at least one neighboring RF node designated as a repeater.

Continuing to block 310, the general repeater designation protocol 300 includes configuring designated RF nodes to act as repeaters to receive and resend network packet transmissions from other RF nodes through the mesh wireless network 25. Finishing in block 320, the general repeater designation protocol 300 includes configuring all RF nodes not designated as repeaters not resend network packet transmissions from other RF nodes through the mesh wireless network 25.

Though two specific types of repeater designation algorithms (matrix and decentralized) can be utilized for designating some but not all of the RF nodes as repeaters in block 305 of the general repeater designation protocol, other algorithms, as well as the specifics of those algorithms, may be implemented instead. The method for deriving an optimal network of connections is only an example and is not intended to be limiting.

Any repeater designation algorithm will be implemented in programming. The goal of an example repeater designation algorithm may include minimizing the number of repeaters, which minimizes the number of times network packets are repeated, while guaranteeing that each RF node has at least N number of neighbor connections that are repeaters. Again, the focus in on storing the relevant results of a repeater designation algorithm within the RF nodes before those results are requested to facilitate messaging over the wireless mesh network 25.

Figure 9:
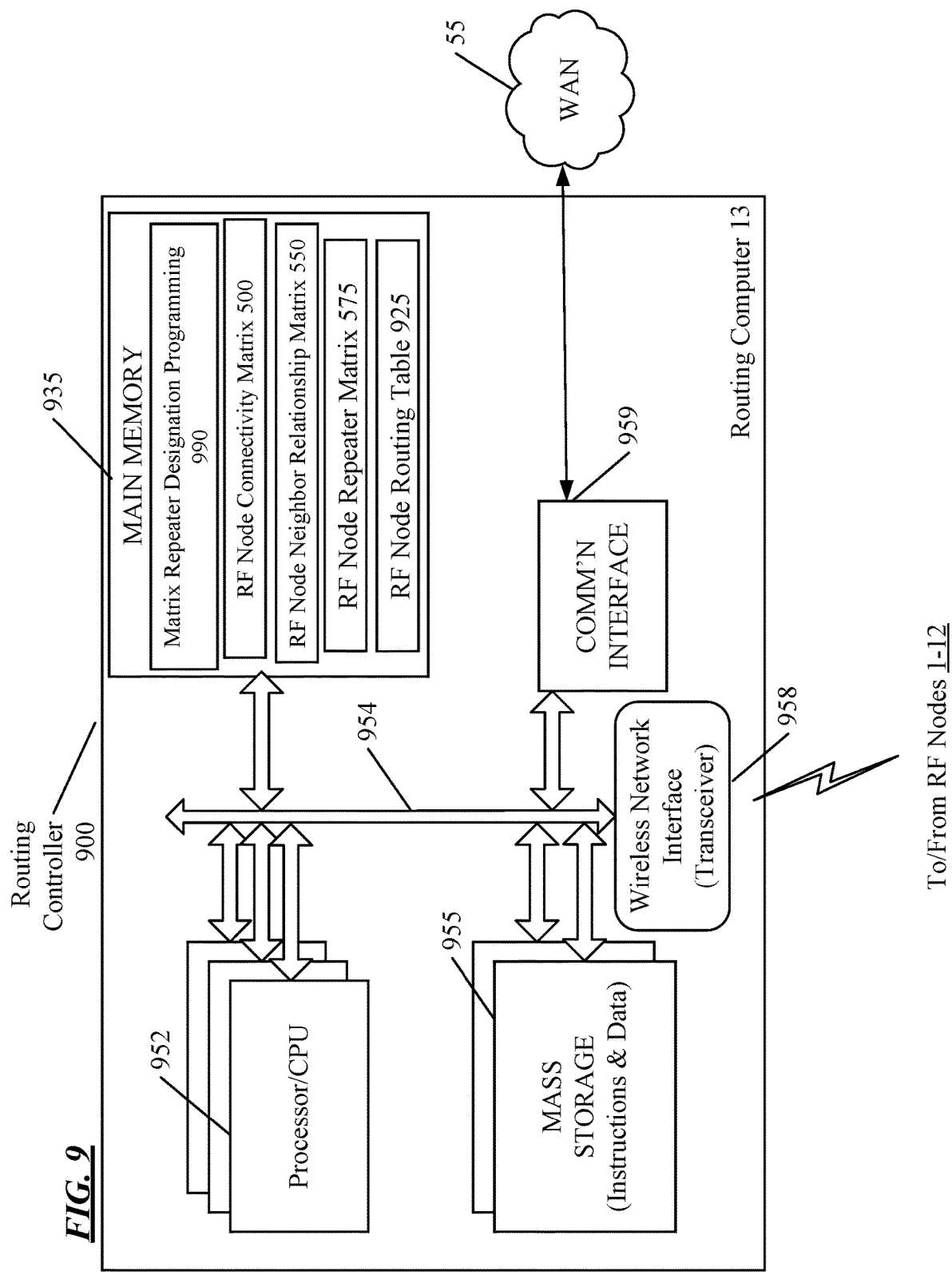
FIG. 9 is a functional block diagram of the routing computer, by way of just one example of a computing device platform that may perform the functions of the routing controller.

FIG. 4 is a flow chart of a matrix repeater designation protocol 400 (e.g., implemented in matrix repeater designation programming 990 of FIG. 9) for designating some but not all of the RF nodes 1-12 of the mesh wireless network 25 as repeaters. The matrix repeater designation protocol 400 is implemented as sub-blocks of block 305 of the general repeater designation protocol 300 FIG. 3. This matrix repeater designation protocol 400 is implemented as a centralized network protocol in the routing computer 13.

Beginning in block 405, the matrix repeater designation protocol 400 includes building an RF node neighbor relationship matrix 550 that includes a respective neighbor relationship status 551A-X, 552A-X, . . . 574A-X of each respective RF node (e.g., 1) to other RF nodes (e.g., 2-24). As shown in FIG. 5B, the RF node neighbor relationship matrix 550 can be a two-dimensional array (shown in human readable table form) of rows and columns that forms a matrix of connections between all RF nodes 1-24. For each respective RF node (e.g., 4, 9) the respective neighbor relationship status (e.g., 551D, 551I) is set to indicate each of one or more neighboring RF nodes (e.g., 4 and 9) is within range to directly transmit and receive network packets to and from the respective RF node (e.g., 1) over the mesh wireless network 25. For each respective RF node (e.g., 4, 7-8, 11, 13, 21, 23), the respective neighbor relationship status (551D, 551G-H, 551K, 551M, 551U, 551W) is unset to indicate each of one or more non-neighboring RF nodes (e.g., 4, 7-8, 11, 13, 21, 23) is not within range to directly transmit and receive network packets to and from the respective RF node (e.g., 1) over the mesh wireless network 25.

Continuing to block 410 (and as shown in FIG. 5B), the matrix repeater designation protocol 400 includes based on the built RF node neighbor relationship matrix 550, determining a respective number of neighbors 551A-X for each respective RF node 1-24. Proceeding to block 420, the matrix repeater designation protocol 400 includes generating an RF node repeater matrix 575 (shown in FIG. 5C). The RF node repeater matrix 575 can be generated by any method that ensures every RF node has at least one neighbor that is a repeater for that RF node. The example method that creates the RF node repeater matrix 575 first designates the RF node that has the most neighbors as a repeater. Then, for each RF node determined to have only one neighbor, that neighbor of the determined RF node is designated as a repeater. In FIG. 5C this sets RF node 22 as a repeater, and leaves RF nodes 4, 7, 8, 11, 13, 21, and 23 unconnected. Next, among the RF nodes that neighbor RF node 22, the RF node that can connect to the most RF nodes that are not currently connected to the first repeater, is set as a repeater. In FIG. 5C this sets RF node 6 as repeater, as RF node 6 has connections to RF node 7 (path loss record 581G), RF node 13 (path loss record 581M), RF node 21 (path loss record 581V), and RF node 23 (path loss record 581X). This step repeats, and therefore an RF node capable of connecting to the most unconnected RF nodes is selected. In this example RF node 5 is selected, to connect to RF node 4 (path loss record 579D). This repeats again, with RF node 4 connecting to RF node 11 (path loss record 578K). By this process, the fewest number of RF nodes carry the largest amount of connections, while having at least one or more routes between any two RF nodes. Again, a different protocol could assign connections such that there are more connections between each RF node, or perhaps could assign connections to prioritize different types of RF node connections (e.g. as direct a connection as possible between a luminaire 1100 and its respective wall switch 1200A might be prioritized).

Finishing in block 430, the matrix repeater designation protocol 400 includes based on the RF node repeater matrix 575, configuring the designated RF nodes 1-8 and 10-12 to act as repeaters.

FIG. 5A is the RF node path loss matrix 500 used to build the RF node neighbor relationship matrix 550 built in the first block 405 of the matrix repeater designation protocol 400. An RF node identifier, in this example 1-24 is shown along the headings of the X axis and the Y axis of the RF node path loss matrix 500. As further shown, the quantity of path loss in decibels 501A-X, 502A-X 524A-X is shown inside the RF node path loss matrix 500 for each respective RF node 1-24 to other RF nodes. A path loss amount (e.g., 501B) in this example less than or equal to the number 70 indicates that the neighbor relationship status (e.g., 551B) should be set. A path loss amount (e.g., 502E) greater the number 70 indicates that the neighbor relationship status (e.g., 552E) should be unset. The RF node path loss matrix 500 shows that RF node 9 and RF node 10 will be set as neighbors, due to the number 63 in the areas corresponding to neighbor relationship status 509J, 510I.

FIG. 5B is the RF node neighbor relationship matrix 550 used to build the RF node repeater matrix 575 built in the block 420 of the matrix repeater designation protocol 400. An RF node identifier, in this example 1-24 is shown along the headings of the X axis and the Y axis of the RF node neighbor relationship matrix 550. As further shown, the respective neighbor relationship status 501A-X, 502A-X 524A-X is shown inside the RF node neighbor relationship matrix 550 for each respective RF node 1-24 to other RF nodes. A neighbor relationship status (e.g., 551B) equal to the number 1 indicates that the neighbor relationship status (e.g., 551B) is set. A neighbor relationship status (e.g., 552E) equal to the number 0 indicates that the neighbor relationship status (e.g., 552E) is unset. The RF node neighbor relationship matrix 550 shows that RF node 9 and RF node 10 will be set as neighbors, signified by the number 1 in the areas corresponding to neighbor relationship status 559J, 560I.

On the left column of the RF node neighbor relationship matrix 550, RF nodes 1-24 are shown. RF node 4 only connects to four other nodes (RF nodes 5, 8, 11, 12) and RF node 11 only connects to one other RF node (RF nodes 4). This RF node neighbor relationship matrix 550 demonstrates how each RF node 1-24 could communicate so RF node 4 can only communicate with RF nodes 5, 8, 11 and 12. Looking down the column for RF node 4, it is the same down that column—only RF nodes 5, 8, 11, and 12 can be reached—it is symmetric.

FIG. 5C is the RF node repeater matrix 575 which comprises the connections that the routing computer will preload into the RF nodes 1-12. As described in FIG. 4, any number of algorithms can create a satisfactory RF node repeater matrix 575. The RF node repeater matrix 575 includes only the connections that will be implemented in the lighting system 20. Again, in this example, the total number of repeater nodes was desired to be minimized, with any node having to be a repeater repeating for the maximum number of nodes that needed a repeater. In an uncontrolled flood network, FIG. 5C and FIG. 5B would be substantially the same: all RF nodes capable of repeating for any RF node would repeat for those RF nodes: the only RF nodes that would not be repeaters are those with a single neighbor, and repeaters would repeat for all of their neighbors. Some implementations may prefer this, as a maximally redundant system. Other implementations may prefer concentrating messaging through as few nodes as possible; or may prefer reducing the maximum number of hops between any two RF nodes. However the RF node repeater matrix 575 is populated, this RF node repeater matrix 57 is the information used by the routing computer 13 to pre-populate the routing tables within the RF nodes 1-12.

Figure 6A:
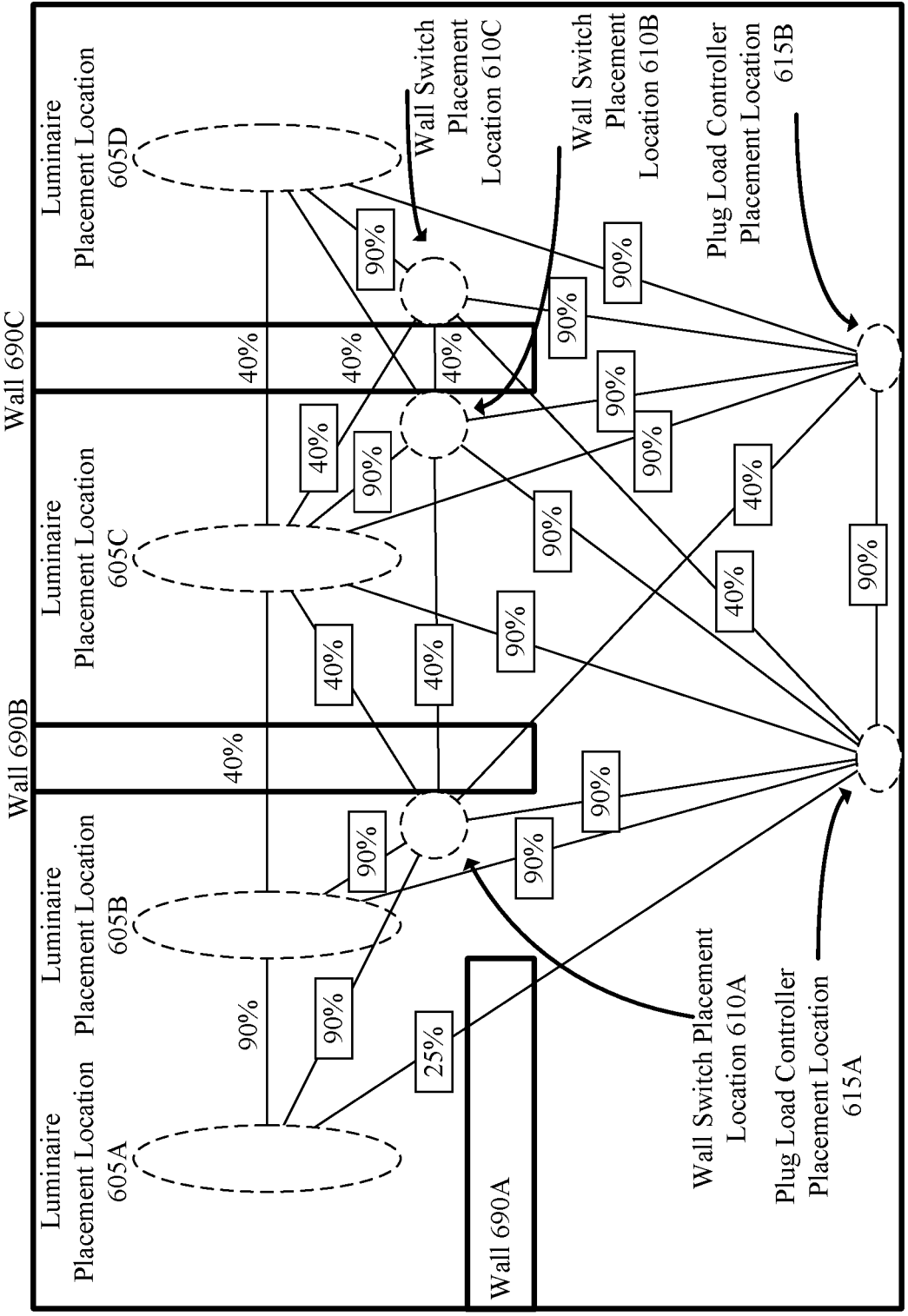
FIG. 6A is an example of an RF map in an example room, with potential connections between potential RF nodes defined in terms of a quality percentage rating.

FIG. 6A is an RF map 600A of potential installation locations for luminaire RF nodes 605A-D, potential installation locations for wall switches 610A-C, potential installation locations for plug load controllers 615A-B, and the connection quality rating between various RF nodes potential installation locations 605A-D, 610-A-C, 615A-B. Various walls 690 are placed in the map to illustrate blockages which could impact connection quality rating.

Connection quality ratings are such that a value close to 100% is a high quality connection, whereas a value of 0% would represent absolutely no connection between two RF nodes. These connection quality values would be determined by, before installation of at least one RF node, capturing an RF map of the space. An RF map captures the quality of RF connection between a given point and all other points in a space, and is created during a wireless site survey. Thus, a survey would likely need to be conducted from more than one position within the room, so that the relationships between multiple RF nodes, and not just a single RF node and every other RF node, can be assessed. Once these RF map captures are combined, a map of the relationship between each potential RF node can be graphed. This is represented in FIG. 6A by showing direct lines between potential RF node installation locations, and attaching the connection quality rating to that line. Thus, a viewer of the RF map can see that, for example, a connection between the two luminaires 605A-B in the left room is likely to be very strong, whereas the connection between the left luminaire in the left room 605A, and the left plug load controller 615A is likely to be very weak. This could be due to factors such as distance, walls, composition of walls, ceilings, floors, and other factors that might impact the impedance of RF signals. Ultimately, this RF map will be used to generate a model of RF behavior, guiding a routing computer in the process of selecting routes for network RF nodes.

Alternatively, the RF model can be estimated, based on a knowledge of certain general principles. For example, RF nodes that have an open-air connection of less than 10 feet could be presumed to have a strong connection, and any nodes separated by more than 4 inches of concrete could be presumed to have poor to no connection. As another option, a mathematical formulation, such as the ITU indoor path loss model, could be used for more precision than rougher guesses based on general principals. If either of these strategies are used, an RF map made up of RF readings does not need to be collected, making the installation process more efficient at the potential expense of a weaker mesh wireless network 25, of reinstalling RF nodes, or of supplementing with additional RF nodes 1-12. Here, projected mesh wireless network performance is based on an RF map of a prospective installation site for the mesh wireless network, and the function to generate a routing table message, which includes a routing table including of all or a subset of all the routes in the mesh wireless network 25 to be preloaded in a respective RF node's memory, is based on the RF map of a prospective installation site for the mesh wireless network 25.

Figure 6B:
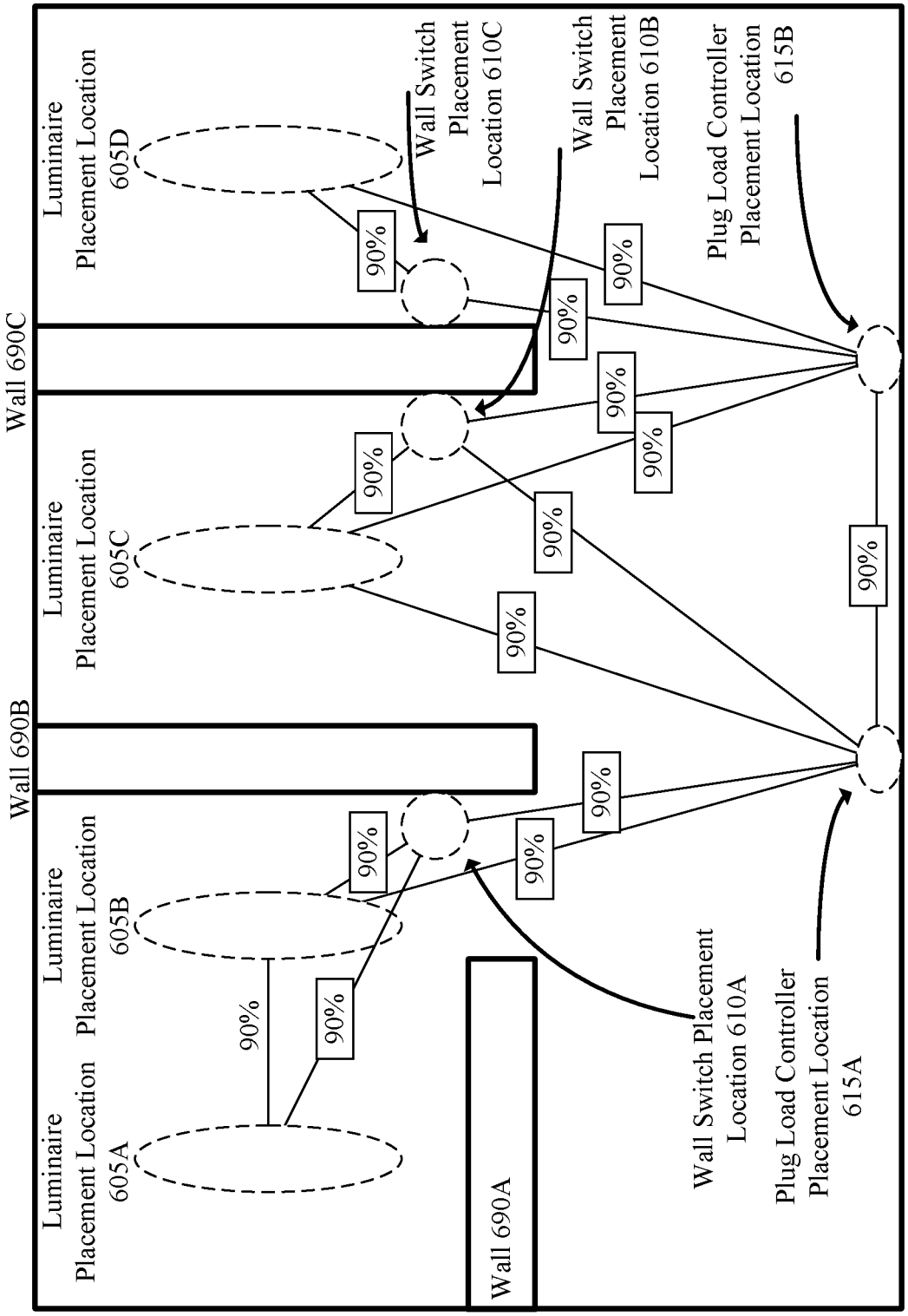
FIG. 6B is a map of the route selections made by a routing computer when presented with the data from FIG. 6A.

FIG. 6B depicts the RF map 600B of a room where the routing computer 13 has used an example algorithm to select the necessary routes to optimize this particular lighting system 20. This example algorithm is relatively straightforward: all routes with a 90% rating or higher are used, due to these strong connections not projected to take a toll on the wireless mesh network 25. Next, connections between a luminaire 605 and its associated wall switch 610 are maintained, even if the connection has a rating lower than 90%. This system emphasizes strong and relevant connections, over reduced messaging or increased robustness. However, again, as discussed in FIGS. 4 and 5, different methods for selecting connections can be applied. This illustrates that the routing computer has programming that, when executed, sets a path loss threshold value, and records whether two respective RF nodes associated with path loss information indicates that path loss between the two respective RF nodes is greater than the path loss threshold. There is not a neighbor relationship status between such two respective RF nodes.

FIG. 6C depicts the RF map 600C of a room after the RF nodes 625A-D, 630-A-C, 635A-B have had their routes preloaded by a routing computer 13, and the RF nodes 625A-D, 630-A-C, 635A-B have been installed in the potential installation locations 605A-D, 610-A-C, 615A-B. When compared to FIG. 6A, it can be seen that the actual quality of connections between RF nodes 625A-D, 630-A-C, 635A-B vary from their estimated values. However, the estimation in FIG. 6A is relatively accurate, and so the variation is minimal. These variations may be due to quirks in the ceilings, walls, or floors, increasing or decreasing RF impedance. The variation may also be caused by furniture, plants, electronics, art, or doors that were not present when the initial RF map 600A was made. The routing table messages received by the RF nodes in this example were received while the RF nodes are not connected to the mesh wireless network. Further, in this depiction, the mesh wireless network 25 has no RF nodes receiving and resending network packet transmissions from other RF nodes until all the RF nodes in the RF communication system have received routing table messages.

Figure 6D:
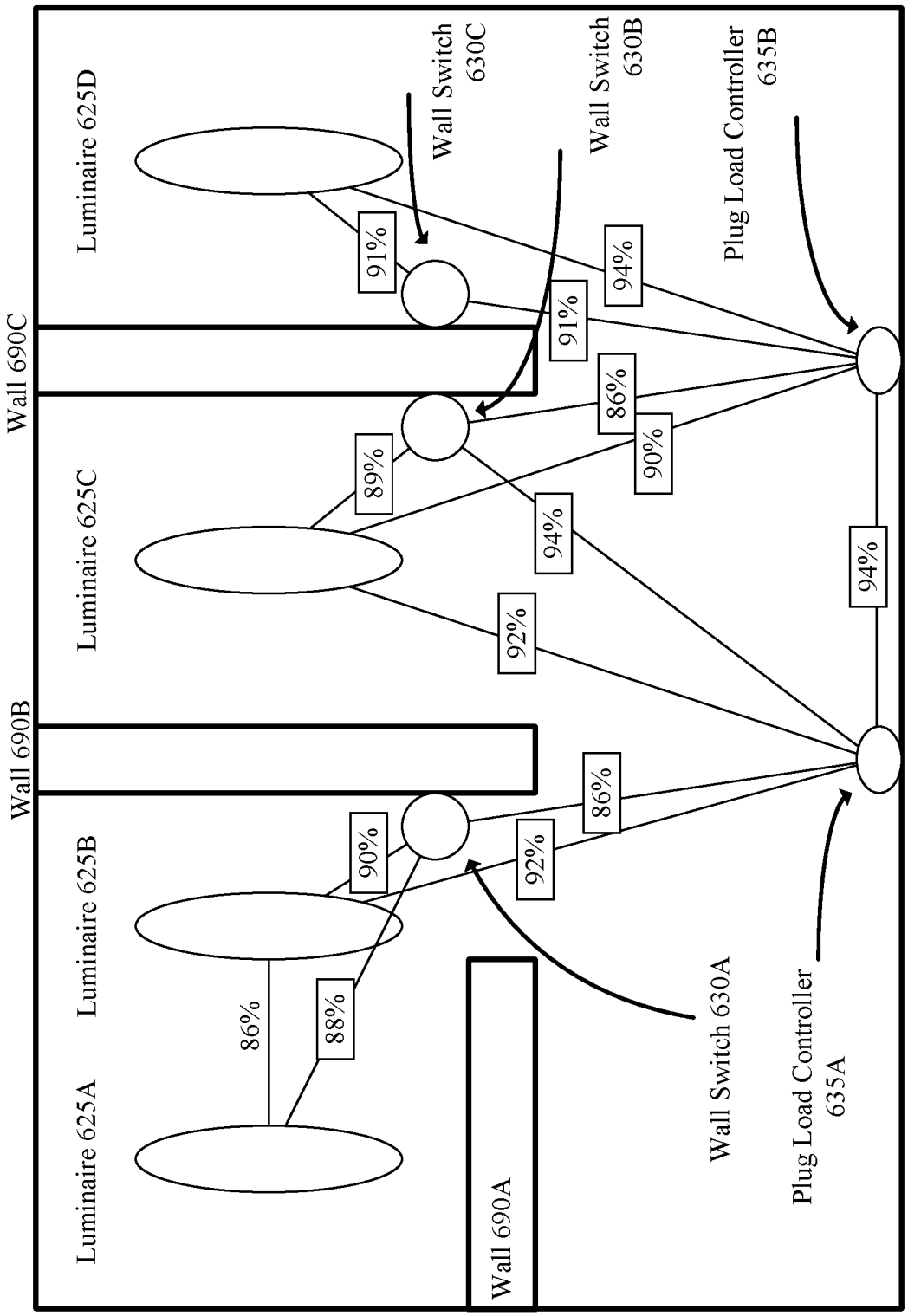
FIG. 6D is a map of the actual routes between installed RF nodes in the room depicted in FIG. 6A, based on the route selections depicted in FIG. 6B.

FIG. 6D depicts the RF map 600D of the actual routes the routing computer 13 selected as depicted in FIG. 6B. Again, as discussed in FIG. 6C, because in this example the variation between the estimate RF map 600A and the actual RF map 600C is minimal, the routing computer 13 has selected routes that conform to desired performance.

Figure 6E:
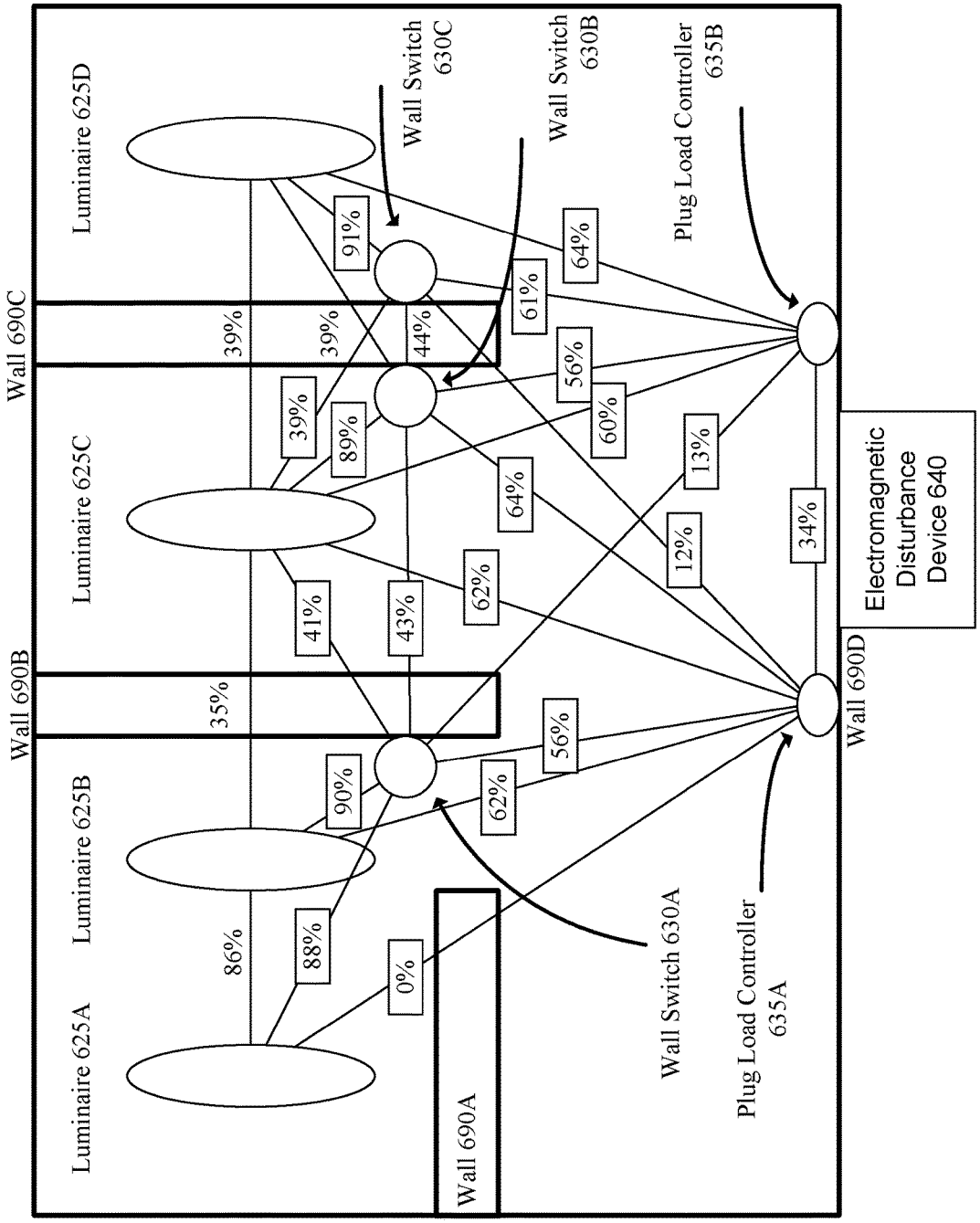
FIG. 6E is an example of an RF map, similar to that depicted in FIG. 6A, but with a large electromagnetic disturbance device installed on the exterior of the bottom face of the example room, after routing data has been loaded into the RF nodes.

FIG. 6E depicts the RF map 600E of the room with the RF nodes installed. However, in this example, after the estimated RF map 600A was captured, the neighboring room has installed a large electromagnetically disturbing device 640. This device could for example be a large microwave, or perhaps a magnetic resonance imaging (MM) machine. As compared to the RF map 600C from FIG. 6C, the quality of connection is severely degraded near the electromagnetic disturbance device 640, with quality remaining more or less unaffected on the opposite side of the room. However, since the actual routed RF map 600D sends a large quantity of messages through the plug load controllers 635A-B, muffling these plug load controllers 635A-B essentially disrupts the network, which has no way on its own to reroute along routes that are not within respective RF nodes 625A-D, 630-A-C, 635A-B routing tables 1199.

FIG. 6F depicts the RF map 600F after a routing computer 13 has readjusted the lighting system 20 routes. In some embodiments, one of the RF nodes is a gateway RF node 9 acting as a network controller 1000. This network controller 1000 can collect network diagnostic information via the reloading routing protocol 800 described in FIG. 8, and send this data over a wide area network (WAN) 55 to a routing computer 13 to aid in adjusting routing within the wireless mesh network 25. That routing computer may have the initial estimated RF map 600A, and could utilize this information along with diagnostic information to reform and reroute the mesh wireless network 25. The routing computer 13 sends back new routing information to the network controller 1000 RF node, which then stores it in its RF node routing table 925, and further attempts to forward this information to the rest of the RF nodes 625A-D, 630-A-C, 635A-B. The routing computer 13 and the network controller 1000 RF node may engage in several rounds of messaging, attempting to improve the wireless mesh network 25 until all RF nodes 625A-D, 630-A-C, 635A-B are connected and performing as expected.

In this specific example, the routing computer 13 was able to collect the entire updated RF map 600E. The routing computer 13 then, applying a different process than before, removed any potential route that had a quality rating less than 30% and was not an RF node's only connection to the rest of the network. Next, the system artificially added 30% to any route between a luminaire 625 and its paired wall switch 630, as well as between any luminaires 625 that share a paired wall switch. Finally, the routing computer preserved each RF nodes' or group of RF nodes' (a grouping formed by shared functionality, such as two luminaires 625A-B and their linked wall switch 630A) strongest connection to the rest of the wireless mesh network 25, as well as any connection rated at or over 90%. This results in the RF map 600F in FIG. 6F. These routes are then loaded into the RF nodes by the network controller 1000 RF node, and performance is restored. Further, as discussed in FIGS. 4, 5, and 6B, this method of selecting routes between RF nodes 625A-D, 630-A-C, 635A-B is an example, and different methods for selecting connections can be implemented within the routing computer 13.

Therefore, FIG. 6F depicts a radio frequency (RF) communication system 20 including a plurality of RF nodes 625A-D, 630A-C, 635A-B connected via a mesh wireless network 25. Each RF node 625A-D, 630A-C, 635A-B has similar components, which can be exemplified in the luminaire RF node 1100. The RF node 1100 has an RF node processor 1130, an RF node wireless transceiver 1145, and RF node memory 1135. The RF node wireless transceivers 1145 are set up for data communication over the mesh wireless network 25, and the transceivers 1145 are coupled to the RF node processor 1130. The RF node memory 1135 is coupled to the RF node processor 1130 of the RF node 1100, and the RF node memory 1135 includes a copy of a preloaded routing table 1199 which includes all or a subset of the routes in the mesh wireless network 25.

The example RF node 1100 also has programming stored in the RF node memory 1135, and execution of the programming 1190 by an RF node processor 1130 configures the associated RF node 1100 to implement functions. In implementing these functions, the RF node 1100 receives a routing table message. The routing table message includes the preloaded routing table 1199 communicated to the RF node wireless transceiver 1145 and a repeater designation for the recipient RF node 1100. The RF node 1100 also stores the preloaded routing table 1199 communicated to the respective RF node wireless transceiver 1145 within its RF node memory 1135. In response to being designated as a repeater, the RF node 1100 configures itself to act as a repeater. Repeaters resend network packet transmissions from other RF nodes 1-8, 10-12 through the mesh wireless network 25, based on the routes in the preloaded routing table 1199, in real-time. However, when an RF node 1100 is not designated as a repeater, the RF node 1100 configures itself not to resend network packet transmissions from other RF nodes 1-8, 10-12 through the mesh wireless network 25.

In this example, the RF node memory 1145 includes a non-volatile memory component capable of persisting the preloaded routing table through external power loss. An RF node 1100 stores the preloaded routing table 1199 communicated to that RF node's 1100 wireless transceiver 1145 within the non-volatile memory 1135 capable of persisting data through that RF node 1100 experiencing external power loss.

This example further includes a routing computer 900 built with a routing computer processor 952, a routing computer wireless transceiver 958, and a routing computer memory 935. The routing computer wireless transceiver 958 is set up for data communication with RF nodes 1-8, 10-12, and the transceiver 958 is coupled to the routing computer processor 952. The routing computer memory 935 is coupled to the routing computer processor 952 of the routing computer 900, and includes an RF model of the space 21.

The routing computer 900 also has programming in the routing computer memory 935, and execution of the programming by the routing computer processor 952 configures the routing computer 900 to implement functions. In implementing these functions, the routing computer 900 sends a preloaded routing table 1199 to a given RF node 1100. In doing so, the routing computer uses its routing wireless transceiver 958 to communicate with the given RF node's 1100 wireless transceiver 1145. The routing computer 900 does not do this via the mesh wireless network 25, as the routing computer 900 is not directly connected to the mesh wireless network 25.

In the example presented in FIG. 6F, there is an RF model of the space in the routing computer memory 935. The RF model of the space is an RF propagation model map 600F of a building space. There is additional programming in the routing computer memory 935, and execution of the programming by the routing computer processor 952 further configures the routing computer 900 to implement functions. In implementing these additional functions, the routing computer 900 generates a preloaded routing table 925 based on the RF propagation model of the space, and send a routing table message. This message includes a routing table 1199 including all or a subset of all the routes in the mesh wireless network 25, with the intention of having a recipient RF node, such as luminaire 1100, preload this routing table into the memory 1135 of the recipient RF node 1100.

Additionally, in this example, the updated routing table messages generated by the routing computer 900 are forwarded first to a gateway RF node 9, which propagates the routing table messages to the other RF nodes 1-8, 10-12 of the mesh wireless network 25. The gateway RF node 9 additionally sends back path loss information from the other RF nodes 1-8, 10-12 to the routing computer 900.

These example RF nodes 1-8, 10-12 are also able to record the RF nodes 1100 assigned to receive and resend network packet transmissions from a given RF node 1-8, 10-12 to the gateway RF node 9. However, in this example, the individual RF nodes 1-8, 10-12 are prohibited from generating the routing table 1199 in their RF node's 1100 memory 1135—in this example, the routing table 1199 is generated and originated from the routing computer 900.

FIG. 7 is a flow chart of a preloading routing protocol 700 (e.g., implemented in preloading routing programming of FIG. 9) for loading routes determined in the matrix repeater designation protocol 400. The preloading routing protocol is implemented in the routing computer 13.

Beginning in block 705, the routing computer 13 connects to an RF node 1-12 that is not currently connected to the wireless mesh network 25. Commonly, this may be at a manufacturing facility, a staging warehouse, or an installing technician's vehicle. The form factor of the routing computer 13 could be large, like a personal computer or a server, or small, like a hand held computer. The routing computer's 13 functionality may be divided across multiple devices, such that a computing server performs the matrices calculations and route selections, while a hand held device interfaces with the RF node.

Block 710 continues with the routing computer 13 selecting the routing records appropriate for the particular RF node it is currently connected to. In some implementations, every RF node in a wireless mesh network will have the addressing and routing information of every other RF node. In other networks, this information might be segmented: perhaps in a lighting system 20 that spans an entire floor of commercial office space, including multiple tenants. The entire system may need to be able to communicate with a building-level control RF node, but individual RF nodes providing lighting service to tenant A may not need knowledge or access to the individual RF nodes providing lighting service to tenant B. In other networks, all messages may run through a single central networking RF node, and any individual RF node may only need routing information to reach that central RF node: messages from one non-central RF node to another non-central RF node will be routed by the central RF node upon being received by the central RF node, which would utilize the central RF node's full routing table of the entire mesh wireless network 25.

Next, in block 715, the RF node 1-12, upon receiving whatever routing information provided by the routing computer 13, stores this information in memory. This memory in many embodiments is persisted memory, allowing the RF node to be turned off, and potentially even repackaged and stored for an extended period of time, before it is installed in its final location.

Upon being completely preloaded, in block 720 the routing computer 13 disconnects from the RF node 1-12. Unless an embodiment of a lighting system 20 implements a gateway RF node 9, this is likely the last time the routing computer 13 and this RF node 1-8, 10-12 will communicate, and that the RF node 1-8, 10-12 will have update made to its network routing tables 1199.

Later, after installation in the physical space 21 of the lighting system 20, the RF node 1-12 is activated in block 725. Upon this activation, the RF node 1-12 will attempt to connect to other nearby RF nodes 1-12 that are recorded within the RF node's routing records provided by the routing computer 13.

Finally, after making contact with the wireless mesh network 25, in block 730 all communication with that wireless mesh network 25 is based on the routing information provided by the routing computer 13. Any changes to that routing information are provided, directly or indirectly, by a routing computer 13 that is not a part of the lighting system 20.

FIG. 8 is a flow chart of a reloading routing protocol 800 (e.g., implemented in reloading routing programming of FIG. 10) for diagnosing and updating routing information when the mesh wireless network 25 experiences sustained degraded connection quality.

Beginning in block 805, the gateway RF node 9, in an implementation of the lighting system 20 that includes a gateway RF node 9, collects diagnostic information related to the performance of the mesh wireless network 25. This information may be rates of packet drops, how often heartbeat messages are received or missed (messages that signal to the remainder of the mesh wireless network 25 that an individual RF node 1-12 is connected), or even RF map ratings generated by RF nodes 1-12.

Once the gateway RF node 9 determines that material and sustained network degradation has occurred, in block 810 it connects to the routing computer 13, potentially via a WAN 55, and sends the collected diagnostic data, or an aggregation of that data. The routing computer 13, takes this information in block 815, and potentially uses it in combination with any other RF mapping data or diagnostic data the routing computer 13 already possessed, to generate new routing information.

In block 820, the gateway RF node 9 receives newly generated routing information for the mesh wireless network 25 from the routing computer 13. This information is also tagged with which nodes require which records, because as discussed in block 710 of FIG. 7, not every node is given every routing record in every embodiment. Block 825 depicts the gateway RF node 9 storing this information in the RF node routing table 925, so that it can repeatedly attempt to propagate it through the degraded mesh wireless network 25.

Finally, block 830 has the gateway RF node 9 propagating the routing information to the rest of the mesh wireless network 25. This may take several attempts, depending on the level of degradation of the mesh wireless network 25. The updated routings may improve performance marginally, or even worsen the network performance, so steps 805 through 830 may need to be repeated until the mesh wireless network 25 is performing acceptably. If acceptable performance cannot be achieved, users are notified so that more intensive network corrections can be made.

FIG. 9 is a functional block diagram of the routing computer 13, by way of just one example of a computing device platform that may perform the functions of the routing controller 900. Routing computer 13 will generally be described as an implementation of a server or host type computer, e.g. as might be configured as a blade device in a server farm or in network room of a particular premises. Routing computer 13 may comprise a mainframe or other type of host computer system. As shown, routing computer 13 includes a wireless network interface 958 to and from the RF nodes 1-12 to be installed in the physical space 21.

Routing computer 13 also includes another network communication interface 959 for network communications over the WAN 55.

The routing computer 13 in the example includes a central processing unit (CPU) 952 formed of one or more processors, a main memory 935, mass storage 955, and an interconnect bus 954. The circuitry forming the CPU 952 may include a single microprocessor, or may include a number of microprocessors for configuring the computer system as a multi-processor system, or may use a higher speed processing architecture. The main memory 935 in the example includes ROM, RAM and cache memory; although other memory devices may be added or substituted. Although semiconductor memory may be used in the mass storage devices 955, magnetic type devices (tape or disk) and optical disk devices may be used to provide higher volume storage. In operation, the main memory 935 stores at least portions of instructions and data for execution by the CPU 952, although instructions and data are moved between memory 935 and storage 955 and the CPU 952 via the interconnect bus 954.

The routing computer 13 also includes one or more input/output interfaces for communications, shown by way of example as interface 959 for data communications via the WAN 55 as well as a WiFi or Bluetooth type wireless transceiver 958 for communications over the mesh wireless network 25. Network communication interface 959 may be a high-speed modem, an Ethernet (optical, cable or wireless) card or any other appropriate data communications device. The physical communication link(s) to/from the network communication interface 959 may be optical, wired, or wireless (e.g., via satellite or cellular network). Although other transceiver arrangements may be used, the example routing computer 13 utilizes a WiFi or Bluetooth type wireless transceiver 958 similar to the other RF nodes 1-12 for communication to and from the RF nodes 1-12. The wireless transceiver 958 enables the routing computer 13 to communicate over-the-air with the WiFi type wireless transceivers 1145 of RF nodes 1-12 of the lighting system 20.

Although not shown, the computer platform configured as the routing computer 13 may further include appropriate input/output ports for interconnection with a local display and a keyboard and mouse or with a touchscreen or the like, serving as a local user interface for configuration, programming or trouble-shooting purposes. Alternatively, the operations personnel may interact with the computer system of the routing computer 13 for control and programming of the system from remote terminal devices via the Internet or some other link via WAN 55.

In the example of FIG. 9, the routing computer 13 implements the routing controller 900. The routing controller 900 includes a wireless transceiver 958 configured for data communication to and from radio frequency (RF) nodes 1-12. Routing controller 900 includes a processor 925 coupled to the wireless transceiver 958 and a memory 935 accessible to the processor 952. The routing controller 900 includes matrix repeater designation programming 990 in the memory. Routing controller 900 includes the data represented in the RF node connectivity matrix 500, depicted in FIG. 5A, the RF node neighbor relationship matrix 550 depicted in FIG. 5B, and the RF node repeater matrix 575 depicted in FIG. 5C. Further, the memory 935 includes the finalized RF node routing table 925, a subset of which 1199 will be installed in RF nodes 1-8, 10-12.

Execution of the matrix repeater designation programming 990 by the processor 952 configures the network controller 900 to implement the matrix repeater designation protocol 400 described generally in FIG. 3 and more specifically in FIGS. 4-8. Other matrix repeater designation protocols may be utilized to prioritize differently structure mesh wireless networks 25.

The example of FIG. 9 shows a single instance of routing computer 13. Of course, the routing functions may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like that of the routing computer 13 generally are conventional in nature, and it is presumed that those skilled in the art are sufficiently familiar therewith to understand implementation of the present system and associated lighting control technique using suitable configuration and/or programming of such computer system(s).

FIG. 10 is a functional block diagram of the gateway RF node 9, by way of just one example of a computing device platform that may perform the functions of the network controller 1000. Although the gateway 9 implements the network controller 1000 in the example any of the other RF nodes 1-8 and 10-12 can implement the network controller 1000. For example, the network controller 1000 can be an integrated luminaire (or a standalone touchscreen device 1200B of FIG. 12B). If the network controller 1000 is a luminaire, then network controller 1000 is line powered and remains operational as long as power is available. Alternatively, if network controller 1000 is a touch screen type device 1200B as described in FIG. 12B, network controller 1000 may be battery powered.

Gateway 9 will generally be described as an implementation of a server or host type computer, e.g. as might be configured as a blade device in a server farm or in network room of a particular premises. Gateway 9 may comprise a mainframe or other type of host computer system. As shown, gateway 9 includes a wireless network interface 1058 to and from the mesh wireless network 25 on-premises to RF nodes 1-8 and 10-12 installed in the physical space 21. Gateway 9 also includes another network communication interface 1059 for off-premises network communications over the WAN 55 to a routing computer 13.

The gateway 9 in the example includes a central processing unit (CPU) 1052 formed of one or more processors, a main memory 1035, mass storage 1055, and an interconnect bus 1054. The circuitry forming the CPU 1052 may include a single microprocessor, or may include a number of microprocessors for configuring the computer system as a multi-processor system, or may use a higher speed processing architecture. The main memory 1035 in the example includes ROM, RAM and cache memory; although other memory devices may be added or substituted. Although semiconductor memory may be used in the mass storage devices 1055, magnetic type devices (tape or disk) and optical disk devices may be used to provide higher volume storage. In operation, the main memory 1035 stores at least portions of instructions and data for execution by the CPU 1052, although instructions and data are moved between memory 1035 and storage 1055 and the CPU 1952 via the interconnect bus 1054.

The gateway 9 also includes one or more input/output interfaces for communications, shown by way of example as interface 1059 for data communications via the WAN 55 as well as a WiFi or Bluetooth type wireless transceiver 1058 for communications over the mesh wireless network 25.

Network communication interface 1059 may be a high-speed modem, an Ethernet (optical, cable or wireless) card or any other appropriate data communications device. The physical communication link(s) to/from the network communication interface 1059 may be optical, wired, or wireless (e.g., via satellite or cellular network). Although other transceiver arrangements may be used, the example gateway 9 utilizes a WiFi or Bluetooth type wireless transceiver 1058 similar to the other RF nodes 1-8 and 10-12 for communication over the mesh wireless network 25. The wireless transceiver 1058 enables the gateway 9 to communicate over-the-air with the WiFi type wireless transceivers 1145 of RF nodes 1-8 and 10-12 of the lighting system 20 via the mesh wireless network 25.

Although not shown, the computer platform configured as the gateway 9 may further include appropriate input/output ports for interconnection with a local display and a keyboard and mouse or with a touchscreen or the like, serving as a local user interface for configuration, programming or trouble-shooting purposes. Alternatively, the operations personnel may interact with the computer system of the gateway 9 for control and programming of the system from remote terminal devices via the Internet or some other link via WAN 55.

The gateway 9 runs a variety of applications programs and stores various information in a database or the like for control of the fixtures, wall controllers, and any other elements of the lighting system 20 and possibly elements of an overall building managements system (BMS) at the premises. One or more such applications, for example, might enable asset tracking, lighting control through the gateway 9 and/or lighting control based on input from the sensors or wall controllers.

In the example of FIG. 10, the gateway 9 implements the network controller 1000. The network controller 1000 includes a wireless transceiver 1058 configured for data communication over a mesh wireless network 25 that includes a plurality of radio frequency (RF) nodes 1-8 and 10-12. Network controller 1000 includes a processor 1025 coupled to the wireless transceiver 1058 and a memory 1035 accessible to the processor 1052.

The example of FIG. 10 shows a single instance of gateway 9. Of course, the gateway functions may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like that of the gateway 9 generally are conventional in nature, and it is presumed that those skilled in the art are sufficiently familiar therewith to understand implementation of the present system and associated lighting control technique using suitable configuration and/or programming of such computer system(s).

FIG. 11 is a block diagram of a luminaire 1100 configured as RF nodes 1-8 that communicate via the mesh wireless network 25 in the lighting system of FIG. 1. In FIG. 11, drive/sense circuitry 1155 and detectors 1160 are on-board the luminaire 1100. Detectors 1160 can be infrared sensors for occupancy or motion detection, an in-fixture daylight sensor, an audio sensor, a temperature sensor, or other environmental sensor. Drive/sense circuitry 1155, such as application firmware, drives the occupancy, audio, and photo sensor hardware.

Luminaire 1100 includes a power supply 1105 driven by a power source 1101. Power supply 1105 receives power from the power source 1101, such as an AC mains, battery, solar panel, or any other AC or DC source. Power supply 1105 may include a magnetic transformer, electronic transformer, switching converter, rectifier, or any other similar type of circuit to convert an input power signal into a power signal suitable for light source 1115. Light source 1115 includes electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 1115 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

Luminaire 1100 further includes, a driver circuit 1110, for example, an intelligent light emitting diode (LED) driver circuit. Driver circuit 1110 is coupled to light source 1115 and drives that light source 1115 by regulating the power to light source 1115 by providing a constant quantity or power to light source 1115 as its electrical properties change with temperature, for example. The driver circuit 1110 provides power to light source 1115. Driver circuit 1110 may be a constant-voltage driver, constant-current driver, or AC LED driver type circuit that provides dimming through a pulse width modulation circuit and may have many channels for separate control of different LEDs or LED arrays that comprise light source 1115. An example of a commercially available intelligent LED driver circuit 1110 is manufactured by EldoLED®.

Driver circuit 1110 can further include an AC or DC current source or voltage source, a regulator, an amplifier (such as a linear amplifier or switching amplifier), a buck, boost, or buck/boost converter, or any other similar type of circuit or component. Driver circuit 1110 outputs a variable voltage or current to the light source 1115 that may include a DC offset, such that its average value is nonzero, and/or an AC voltage.

For purposes of communication and control, luminaire 1100 is treated as a single or a multi-addressable device that can be configured to operate as a member of the mesh wireless network 25. Luminaire 1100 includes power distribution circuitry 1125, a microprocessor 1130, and a memory 1135. As shown, microprocessor 1130 is coupled to driver circuit 1110 and the microprocessor 1130 includes a central processing unit (CPU) that controls the light source operation of the light source 1115. Memory 1135 can include volatile and non-volatile storage.

The power distribution circuitry 1125 distributes power and ground voltages to the processor 1130, memory 1135, network communication interface(s) 1145 (e.g., wireless transceivers), drive/sense circuitry 1155, and detector(s) 1160 to provide reliable operation of the various circuitry on the luminaire 1100.

Network communication interface(s) 1145 allows for data communication (e.g., wired or wireless) over various networks, including the mesh wireless network 25. For example, luminaire 1100 can includes one band, dual-band, or tri-band wireless radio communication interface system of network communication interface(s) 1145 configured for wireless communication via separate radios that operate at three different frequencies, such as sub-GHz (e.g., 900 MHz), Bluetooth Low Energy (BLE) (2.4 GHz), and 5 GHz, for example. At least one wireless transceiver 1145 is for communication over the mesh wireless network 25.

Microprocessor 1130, including like that shown for the processor/CPU 1052 of gateway 9 in FIG. 10, serve to perform various operations, for example, in accordance with instructions or programming executable by processors 1052, 1130. For example, such operations may include operations related to communications with various lighting system 20 elements, such as RF nodes 1-12 during the repeater designation procedures described herein. Although a processor 1052, 1130 may be configured by use of hardwired logic, typical processors are general processing circuits configured by execution of programming. Processors 1052, 1130 include elements structured and arranged to perform one or more processing functions, typically various data processing functions. Although discrete logic components could be used, the examples utilize components forming a programmable CPU. A processor 1052, 1130 for example includes one or more integrated circuit (IC) chips incorporating the electronic elements to perform the functions of the CPU. The processors 1052, 1130 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in RF nodes 1-12.

It should be noted that a digital signal processor (DSP) or field-programmable gate array (FPGA) could be suitable replacements for the processor 952, 1052, 1130. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 935, 1035, 1135, or a memory of a computer used to download or otherwise install such programming into the RF nodes 1-8, 10-12, or a transportable storage device or a communications medium for carrying program for installation in 1-8 and 10-12.

Memory 1135 like that shown in FIGS. 11-14 and memory 1035 like that shown in FIG. 10 are for storing data and programming. In the example, the main memory system 1035, 1135 may include a flash memory (non-volatile or persistent storage) and a random access memory (RAM) (volatile storage). The RAM serves as short term storage for instructions and data being handled by the processor 1052, 1130, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions, programming, or application(s) may be software or firmware used to implement any other device functions associated with RF nodes 1-8 and 10-12, including network controller 1000, luminaire 1100, wall switch 1200A, touch screen device 1200B, plug load controller 1300, and power pack 1400; network controller 1000 (e.g., gateway 9); and routing computer 13. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 1035, 1135, or a memory of a computer used to download or otherwise install such programming into the RF nodes 1-12, or a transportable storage device or a communications medium for carrying program for installation in the RF nodes 1-12.

As shown, the luminaire 1100 includes programming in the memory 235, which configures the processor 1130 to control operations of the light source 1115, including the communications over the network communication interface(s) 1145 via the wireless network interface(s) 1145. The programming in the memory 1135 includes lighting control programming 1139 to control the light source 1115 and decentralized network programming 1190 to collect connection quality data between the luminaire 1100 and the RF node neighbors 1-12 that the luminaire has routing records for. The memory 1135 further comprises repeater status messages (e.g., test messages used by the decentralized network programming 1190 to determine connection quality 1141A-L).

The memory 1135 further includes a subset 1199 of the routing computer's routing table 925. This subset is the portion of the routing table 925 that is relevant for this luminaire 1100 to communicate over this particular mesh wireless network 25.

Figure 12A:
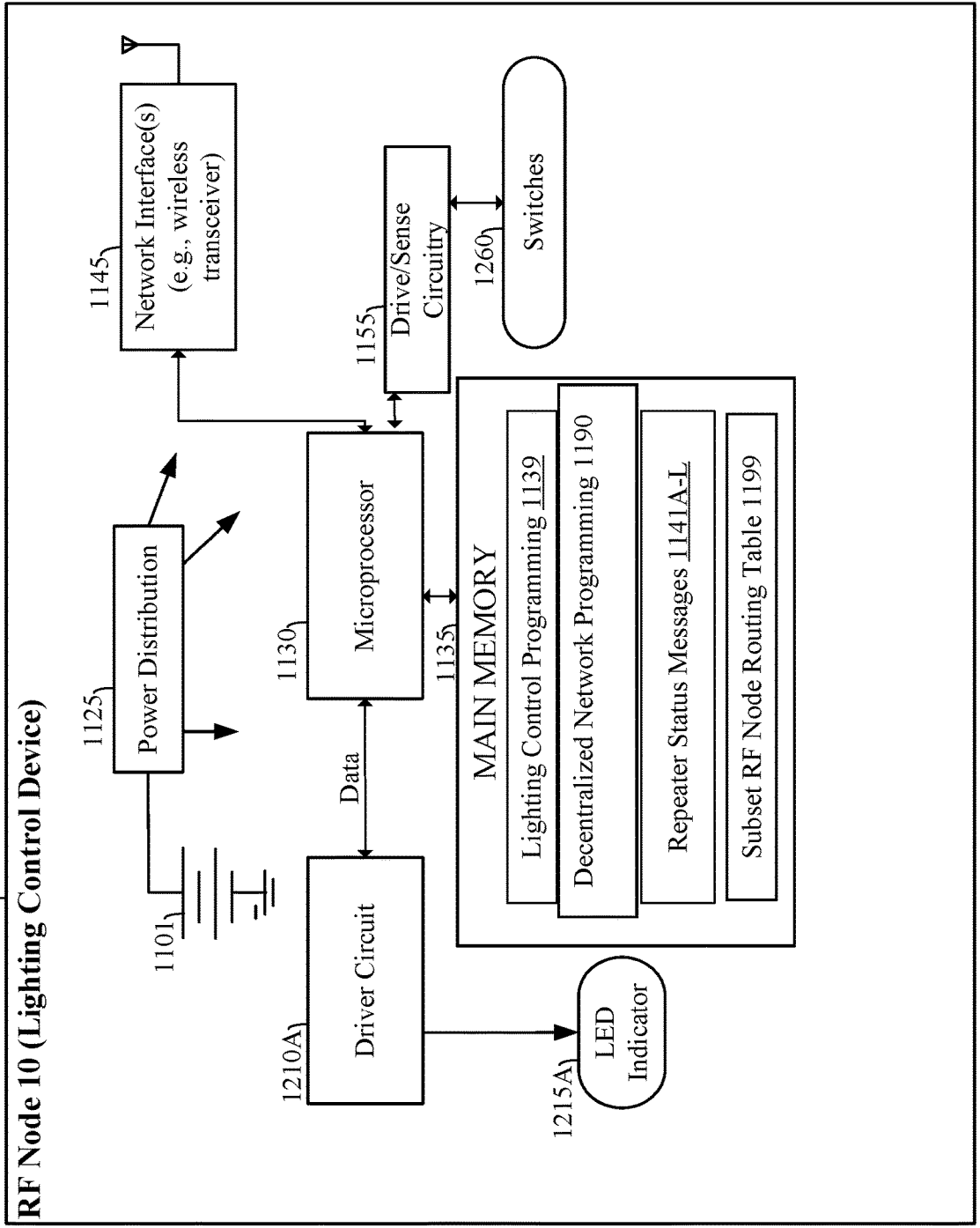
FIGS. 12A-B are block diagrams of two types of lighting control devices that communicate via the mesh wireless network of FIG. 1, specifically a wall switch and touchscreen device.
Figure 12B:
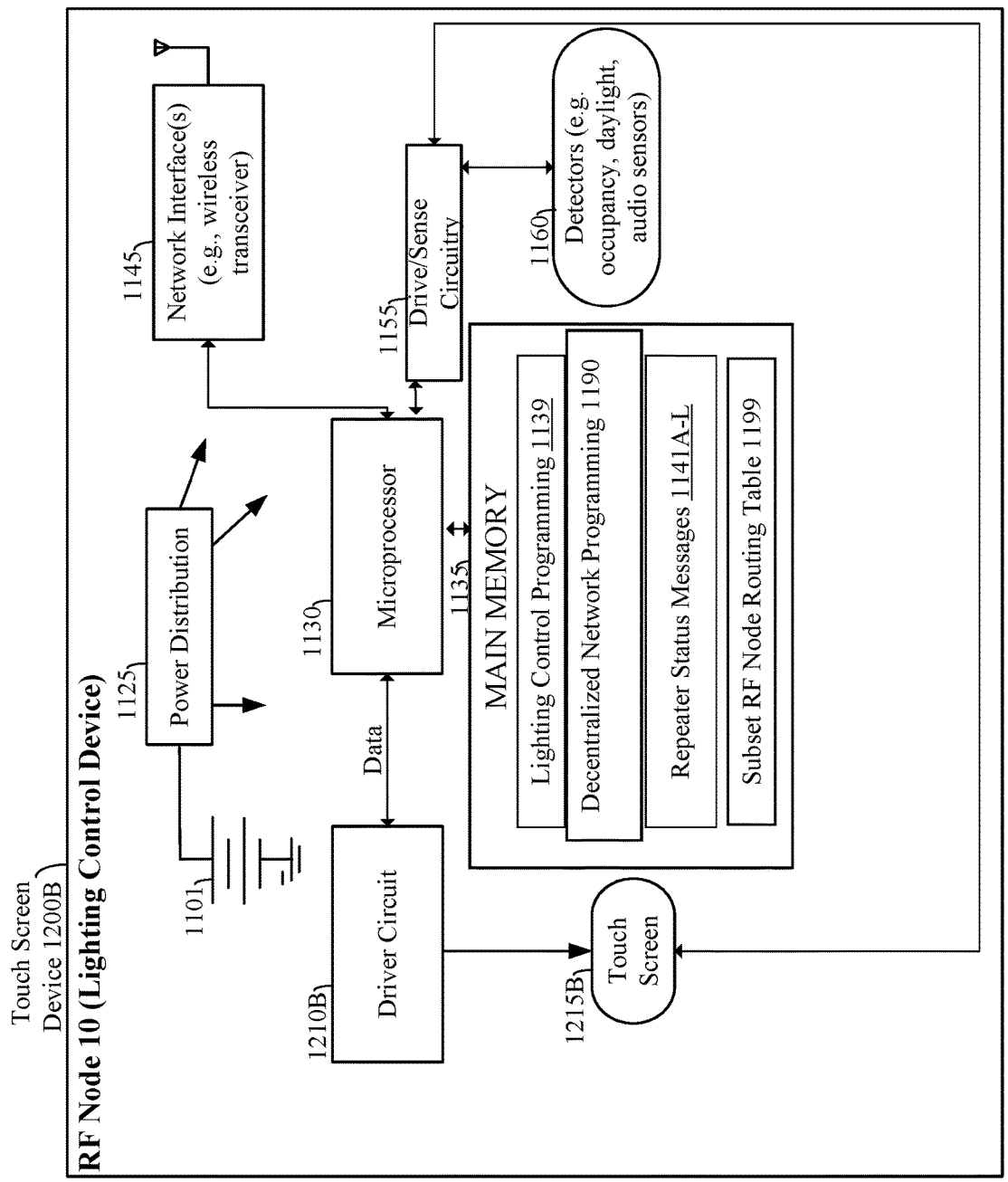

FIGS. 12A-B are block diagrams of two types of lighting control devices 10 that communicate via the mesh wireless network 25 of FIG. 1, specifically a wall switch 1200A and touchscreen device 1200B. The circuitry, hardware, and software of the lighting control devices 1200A, 1200B shown are similar to the luminaire 1100, including the memory 1135, to implement the repeater designation protocols 300, 400 described herein. Hence, main memory 1135 is shown as including the lighting control programming 1139, decentralized network assessment programming 1190, repeater status messages 1141A-L, and a subset of the RF node routing table 1199 based on the RF node routing table 925 created by the routing computer 13. However, as shown, wall switch 1200A and touchscreen device 1200B can include a subset of the circuitry, hardware, and software shown for the luminaire 2000 of FIG. 20.

As shown in FIG. 12A, the RF node 10 is a wall switch 1200A where the drive/sense circuitry 2055 responds to switches 1260. Switches 1260 can be an on/off switch, dimmer switch, or set scene switch based on Acuity Brands Lighting's commercially available xPoint® Wireless ES7 product. In our some examples, wall switch 1200A includes a single shared button switch 1260 for on/off, dimming, or set scene functions and the LED indicator 1215A of wall switch 1200A. A button station can include various button settings that can have the lighting control settings adjusted, for example, four buttons can be arranged with two longitudinal buttons (north-south) and two lateral buttons (east-west).

In FIG. 12B, the RF node 10 is a touchscreen device 1200B where lighting control setting adjustments are inputted via a user interface application (not shown) through manipulation or gestures on a touch screen 1215B. For output purposes, the touch screen 1215B includes a display screen, such as a liquid crystal display (LCD) or light emitting diode (LED) screen or the like. For input purposes, touch screen 1215B includes a plurality of touch sensors.

A keypad may be implemented in hardware as a physical keyboard of touch screen device 1200B, and keys may correspond to hardware keys of such a keyboard. Alternatively, some or all of the keys (and keyboard) of touchscreen device 1200B may be implemented as "soft keys" of a virtual keyboard graphically represented in an appropriate arrangement via touch screen 1215B. The soft keys presented on the touch screen 1215B may allow the user of touchscreen device 1200B to invoke the same user interface functions as with the physical hardware keys.

Drive/sense circuitry 1155 is coupled to touch sensors of touch screen 1215B for detecting the occurrence and relative location/position of each touch with respect to a content display area of touch screen 1215B. In this example, drive/sense circuitry 1155 is configured to provide processor 1130 with touch-position information based on user input received via touch sensors. In some implementations, processor 1130 is configured to correlate the touch position information to specific content being displayed within the content display area on touch screen 1215B. The touch-position information captured by the drive/sense circuitry 1155 and provided to processor 1130 may include, but is not limited to, coordinates identifying the location of each detected touch with respect to the display area of touch screen 1215B and a timestamp corresponding to each detected touch position.

In general, touch screen 1215B and its touch sensors (and one or more keys, if included) are used to provide a textual and graphical user interface for the touchscreen device 1200B. In an example, touch screen 1215B provides viewable content to the user at lighting control device 10. Touch screen 1215B also enables the user to interact directly with the viewable content provided in the content display area, typically by touching the surface of the screen with a finger or an implement such as a stylus.

Figure 13:
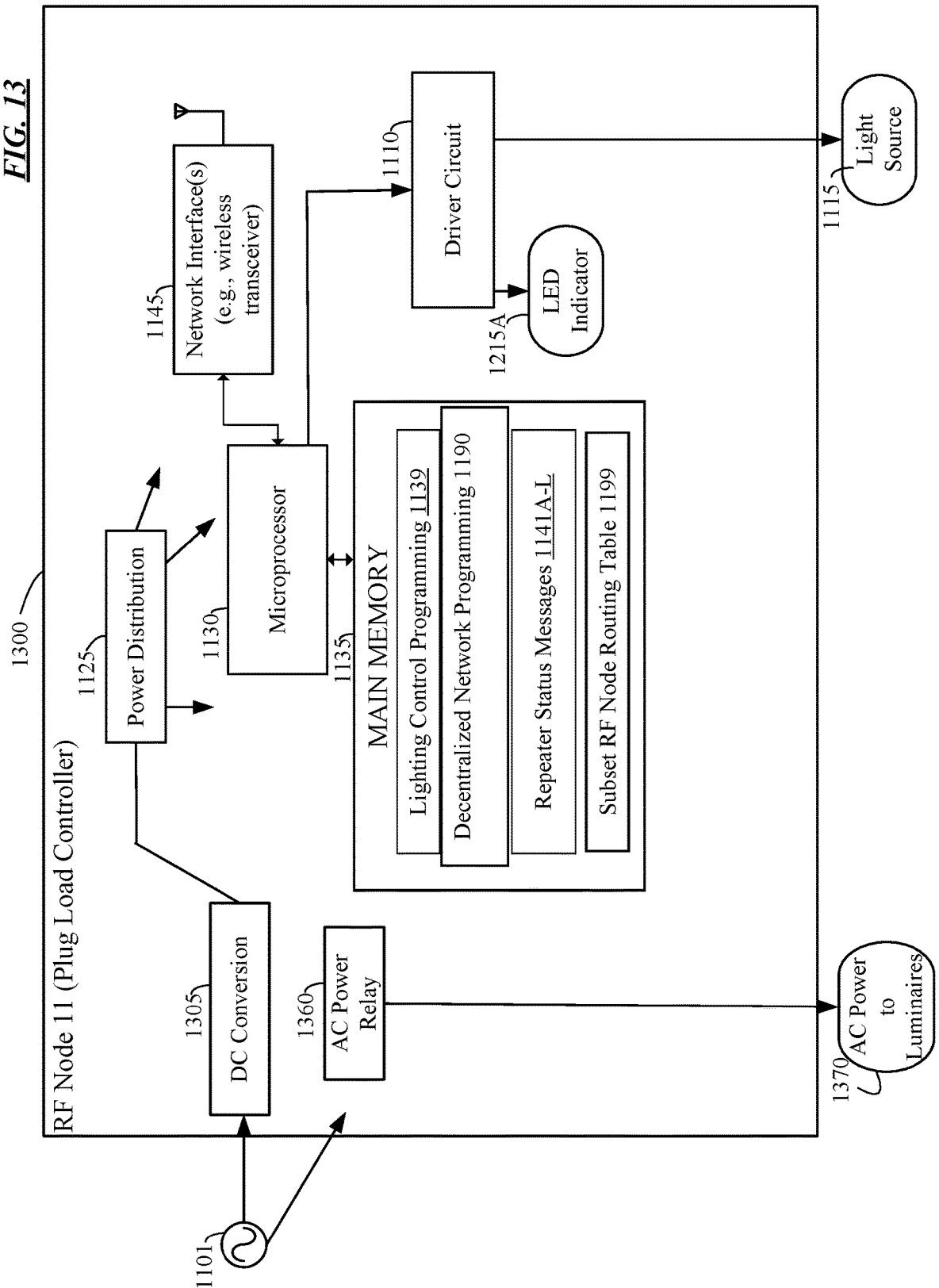
FIG. 13 is a block diagram of a plug load controller type of RF node that communicates via the mesh wireless network of FIG. 1.

FIG. 13 is a block diagram of a plug load controller 1300 type of RF node 11 that communicates via the mesh wireless network 25 of FIG. 1. The circuitry, hardware, and software of plug load controller 1300 shown is similar to the luminaire 1100 of FIG. 11. Hence, main memory 1135 is shown as including the lighting control programming 1139, decentralized network assessment programming 1190, repeater status messages 1141A-L, and a subset of the RF node routing table 1199 based on the RF node routing table 925 created by the routing computer 13.

However, plug load controller 1300 is a retrofit device that plugs into existing AC wall outlets, for example, and allows existing wired lighting devices, such as table lamps or floor lamps that plug into a wall outlet, to operate in the lighting control system. The plug load controller 1300 instantiates the table lamp or floor lamp by allowing for commissioning and maintenance operations and processes wireless lighting controls in order to the allow the lighting device to operate in the lighting system 20. As shown, plug load controller 1300 includes a DC conversion circuit 1305 (which may instead be a power supply) driven by a power source 1101, in our example, an AC line or mains. Power source 1101, however, may be a battery, solar panel, or any other AC or DC source.

DC conversion circuit 1305 receives power from the power source 1101, and may include a magnetic transformer, electronic transformer, switching converter, rectifier, or any other similar type of circuit to convert an input power signal into a suitable power signal to power itself. Plug load controller 1300 further comprises an AC power relay 1360, which relays incoming AC power from power source 1101 to other devices that may plug into the receptacle of plug load controller 1300 thus providing an AC power outlet 1370.

Plug load controller 1300 further includes a driver circuit 1110 to drive the external light source 1115 of the table or floor lamp, for example. The LED indicator 1215A indicates the state of the plug load controller 1300, for example, during commissioning and maintenance procedures.

FIG. 14 is a block diagram of a power pack 1400 that communicates via the mesh wireless network 25 of FIG. 1. The circuitry, hardware, and software of plug load controller 30 shown is similar to the luminaire 1100 of FIG. 11 and plug load controller 1300 of FIG. 13. Hence, main memory 1135 is shown as including the lighting control programming 1139, decentralized network assessment programming 1190, repeater status messages 1141A-L, and a subset of the RF node routing table 1199 based on the RF node routing table 925 created by the routing computer 13. However, power pack 1400 is a device that retrofits with existing wired light fixtures (luminaires). The power pack 1400 instantiates the wired light fixture by allowing for commissioning and maintenance operations and processes wireless lighting controls in order to allow the lighting device to operate in the lighting system 20.

Any of the steps or functionality of the repeater designation protocols 300, 400, and 700 described herein for the routing computer 13 can be embodied in programming or one more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems.

In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The term "real-time" is to be understood as meaning that the time difference between a cause and effect is small enough that a user of a lighting system or an industrial system would not perceive a material delay between their action (e.g. pressing a button) and the system's reaction (e.g. a light turning on or off). A real-time delay is usually considered to be a sub-second delay.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A radio frequency (RF) communication system comprising:
    a plurality of RF nodes connected via a mesh wireless network, wherein each of the RF nodes includes:
        an RF node processor;
        an RF node wireless transceiver, configured for data communication over the mesh wireless network, coupled to the RF node processor;
        an RF node memory coupled to the RF node processor of the RF node;
        programming in the RF node memory, wherein execution of the programming by a respective RF node processor configures a respective RF node to implement functions, including functions to:
            receive a routing table message including a preloaded routing table communicated to the RF node wireless transceiver and a repeater designation for the respective RF node, the preloaded routing table including all or a subset of routes in the mesh wireless network;
            store the preloaded routing table communicated to the respective RF node wireless transceiver within the RF node memory of the respective RF node;
            when the respective RF node is designated as a repeater, configure the respective RF node to act as a repeater, to resend network packet transmissions from other RF nodes through the mesh wireless network, based on the routes in the preloaded routing table, in real-time; and when the respective RF node is not designated as a repeater, configure the respective RF node not to resend network packet transmissions from other RF nodes through the mesh wireless network; and a routing computer, including:
a routing computer processor;
a routing computer wireless transceiver, configured for data communication with RF nodes, coupled to the routing computer processor;
a routing computer memory coupled to the routing computer processor of the routing computer including a RF model of a space; and
programming in the routing computer memory, wherein execution of the programming by the routing computer processor configures the routing computer to implement functions, including functions to:
send the preloaded routing table to a respective RF node from the routing computer wireless transceiver to the respective RF node wireless transceiver;
wherein the routing computer is not connected to the mesh wireless network.

2. The RF communication system of claim 1, wherein:
the RF node memory includes a non-volatile memory component capable of persisting the preloaded routing table through external power loss; and
execution of the RF node wireless programming by a respective RF node processor configures a respective RF node to implement functions, including functions to:
store the preloaded routing table communicated to the respective RF node wireless transceiver within the non-volatile memory capable of persisting data through external power loss of the respective RF node.

3. The RF communication system of claim 1, wherein the RF communication system further includes:
an RF model of the space in the routing computer memory; and
programming in the routing computer memory, wherein execution of the programming by the routing computer processor further configures the routing computer to implement functions, including functions to:
generate the preloaded routing table based on the RF propagation model;
send the routing table message, which includes a routing table consisting of all or a subset of all the routes in the mesh wireless network, to be preloaded in a respective RF node's memory.

4. The RF communication system of claim 3, wherein:
the RF model of the space is an RF propagation model map of a building space.

5. The RF communication system of claim 3, wherein:
the function to generate the preloaded routing table, which designates certain RF nodes to act as repeaters includes:
for each RF node determined to have one neighbor, designating that neighbor of the determined RF node as repeater; and
the function to generate the preloaded routing table, which assigns certain designated RF nodes to act as repeaters for certain other RF nodes includes:
assigning at least one designated repeater of network packets over the mesh wireless network for each respective RF node having one or more RF node neighbors by:
selecting one or more neighbors of any RF nodes not yet having at least one neighbor and designating each selected RF node as a repeater, such that each RF node has at least one neighbor designated as a repeater.

6. The RF communication system of claim 3, wherein the function to generate diagnostic information used by the routing computer to generate the preloaded routing table, which designates certain RF nodes to act as repeaters includes:
(a) transmitting, from each respective RF node to other RF nodes, a neighbor relationship status message;
(b) in response to receiving a reply message to the neighbor relationship status message at each respective RF node from a respective first subset of other RF nodes within a predetermined timeout period:
  i. establishing that each of the respective first subset of other RF nodes are within range to directly transmit and receive network packets to and from the respective RF node over the mesh wireless network, and
  ii. storing a respective RF node identifier of each of the respective first subset of other RF nodes in a respective RF node neighbor list to establish neighbor relationship status;
(c) in response to failing to receive the reply message to the neighbor relationship status message from a respective second subset of the other RF nodes within the predetermined timeout period:
  i. establishing that the respective second subset of other RF nodes are not within range to directly transmit and receive network packets to and from the respective RF node over the mesh wireless network, and
  ii. storing a respective RF node identifier of each of the respective second subset of other RF nodes in a respective non-neighbor RF node list to establish non-neighbor relationship status;
(d) based on the respective RF node neighbor list, for each respective RF node, determining a respective number of neighbors; and
in response to determining that the respective number of neighbors is set to one for the respective RF node, storing a repeater designation for each respective RF node identifier in the respective RF node neighbor list to designate the respective first subset of other RF nodes as repeaters.

7. The RF communication system of claim 3, wherein:
projected mesh wireless network performance is based on an RF map of a prospective installation site for the mesh wireless network, and
the function to generate a routing table message, which includes a routing table including all or a subset of all the routes in the mesh wireless network, to be preloaded in a respective RF node's memory, is based on the RF map of a prospective installation site for the mesh wireless network.

8. A radio frequency (RF) communication system comprising: a plurality of RF nodes connected via a mesh wireless network, wherein each of the RF nodes includes:
an RF node processor;
an RF node wireless transceiver, configured for data communication over the mesh wireless network, coupled to the RF node processor;
an RF node memory coupled to the RF node processor of the RF node; and
programming in the RF node memory, wherein execution of the programming by a respective RF node processor configures a respective RF node to implement functions, including functions to:
receive a routing table message including a preloaded routing table communicated to the RF node wireless transceiver and a repeater designation for the respective RF node, the preloaded routing table including all or a subset of routes in the mesh wireless network;
store the preloaded routing table communicated to the respective RF node wireless transceiver within the RF node memory of the respective RF node;
when the respective RF node is designated as a repeater, configure the respective RF node to act as a repeater, to resend network packet transmissions from other RF nodes through the mesh wireless network, based on the routes in the preloaded routing table, in real-time; and
when the respective RF node is not designated as a repeater, configure the respective RF node not to resend network packet transmissions from other RF nodes through the mesh wireless network;
wherein the routing table message is received by the respective RF node while the respective RF node is not connected to the mesh wireless network.

9. The RF communication system of claim 8, wherein the mesh wireless network has no RF nodes receiving and resending network packet transmissions from other RF nodes until all the RF nodes in the RF communication system have received routing table messages.

10. The RF communication system of claim 1, wherein routing table messages generated by the routing computer are forwarded to a gateway RF node, which propagates the routing table messages to the other RF nodes of the mesh wireless network.

11. The RF communication system of claim 10, wherein the gateway RF node sends path loss information to the routing computer.

12. The RF communication system claim 11, wherein the system further includes:
programming in the routing computer memory, wherein execution of the programming by the routing computer processor further configures the routing computer to implement functions, including functions to:
set a path loss threshold value; and
record whether two respective RF nodes associated with path loss information indicating that path loss between the two respective RF nodes is greater than the path loss threshold, do not have a neighbor relationship status between the two respective RF nodes.

13. The RF communication system of claim 10, wherein execution of the RF node wireless programming by a respective RF node processor further configures a respective RF node to implement functions, including functions to:
record the RF nodes assigned to receive and resend network packet transmissions from the respective RF node to the gateway RF node.

14. The RF communication system of claim 1, wherein a respective RF node is prohibited from generating the routing table in the respective RF node's memory.

15. The RF communication system of claim 1, wherein all RF nodes are prohibited from generating the routing table in the RF node memory of the RF node for any RF node in the RF communication system.

16. The RF communication system of claim 1, wherein the RF communication system is a wireless industrial device control system.

17. The RF communication system of claim 16, further comprising a plurality of industrial control devices, wherein execution of the programming by the RF node process configures each respective RF node:
in response to a receiving an industrial control message, the RF nodes resend the industrial control message based on the preloaded routing table.

18. The RF communication system of claim 1, wherein the RF communication system is a wireless lighting control system.

19. The RF communication system of claim 18, further comprising a plurality of luminaires, a sensor, and a wall switch, wherein execution of the programming by the RF node process configures each respective RF node:
in response to a receiving a lighting control message, the RF nodes resend the lighting control message based on the preloaded routing table.

\* \* \* \* \*